US012657904B2

(12) United States Patent
Chen et al.

(10) Patent No.: US 12,657,904 B2
(45) Date of Patent: Jun. 16, 2026

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Tsewei Chen, Tokyo (JP); Masami Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 328 days.

(21) Appl. No.: 17/698,481

(22) Filed: Mar. 18, 2022

(65) Prior Publication Data

US 2022/0309778 A1　Sep. 29, 2022

(30) Foreign Application Priority Data

Mar. 19, 2021　(JP) ................................ 2021-046240

(51) Int. Cl.
| *G06V 10/94* | (2022.01) |
| *G06V 10/36* | (2022.01) |
| *G06V 10/771* | (2022.01) |
| *G06V 10/82* | (2022.01) |

(52) U.S. Cl.
CPC .............. *G06V 10/95* (2022.01); *G06V 10/36* (2022.01); *G06V 10/771* (2022.01); *G06V 10/82* (2022.01)

(58) Field of Classification Search
CPC ...... G06V 10/95; G06V 10/36; G06V 10/771; G06V 10/82; G06V 10/454; G06V 10/955
See application file for complete search history.

(56) References Cited

U.S. PATENT DOCUMENTS

| 10,861,123 | B2 * | 12/2020 | Chen ........................ G06F 9/545 |
| 11,182,620 | B2 * | 11/2021 | Weinzaepfel .......... G06N 3/045 |
| 11,488,018 | B1 * | 11/2022 | Woo ........................ G06N 3/063 |
| 2011/0239032 | A1 * | 9/2011 | Kato .................... G06V 40/171 |
| | | | 713/500 |
| 2015/0092080 | A1 * | 4/2015 | Maruyama ............. H04N 23/88 |
| | | | 348/223.1 |
| 2016/0219216 | A1 * | 7/2016 | Kasahara ............. H04N 25/611 |
| 2018/0121795 | A1 * | 5/2018 | Kato ........................ G06N 3/10 |
| 2018/0260956 | A1 * | 9/2018 | Huang .................... G06V 20/56 |
| 2019/0114734 | A1 * | 4/2019 | Chen ........................ G06F 9/545 |
| 2020/0111235 | A1 * | 4/2020 | Chen ........................ G06T 7/97 |
| 2020/0151546 | A1 * | 5/2020 | Liu ....................... G06F 18/214 |
| 2020/0175313 | A1 | 6/2020 | Jang |

(Continued)

FOREIGN PATENT DOCUMENTS

JP　　　　2019028657 A　　2/2019

OTHER PUBLICATIONS

Huikai Wu, et al., FastFCN: Rethinking dilated convolution in the backbone for semantic segmentation, 2019, CoRR.

(Continued)

*Primary Examiner* — Xuemei G Chen
(74) *Attorney, Agent, or Firm* — Canon U.S.A., Inc. IP Division

(57) ABSTRACT

An image processing apparatus comprises a first obtaining unit configured to obtain a pixel from a feature image, and a calculating unit configured to perform a convolution operation based on a pixel obtained by the first obtaining unit. The first obtaining unit is capable of obtaining non-adjacent pixels from the feature image.

9 Claims, 23 Drawing Sheets

(56) References Cited

U.S. PATENT DOCUMENTS

| | | | | |
|---|---|---|---|---|
| 2020/0184224 | A1* | 6/2020 | Taylor | G06V 20/48 |
| 2020/0342595 | A1* | 10/2020 | Jia | G06T 7/0012 |
| 2020/0372246 | A1* | 11/2020 | Chidananda | G06N 3/084 |
| 2020/0372332 | A1* | 11/2020 | Kimura | G06V 10/764 |
| 2020/0372648 | A1* | 11/2020 | Zhang | G06N 3/08 |
| 2020/0394516 | A1* | 12/2020 | Chen | G06F 18/2413 |
| 2020/0410036 | A1* | 12/2020 | Huynh | G06V 30/413 |
| 2021/0035304 | A1* | 2/2021 | Jie | G06V 10/25 |
| 2021/0089807 | A1* | 3/2021 | Liu | G06V 10/774 |
| 2021/0118146 | A1* | 4/2021 | Rhodes | G06N 3/045 |
| 2021/0125338 | A1* | 4/2021 | Zhang | G06T 7/11 |
| 2021/0211741 | A1* | 7/2021 | Andreopoulos | H04N 19/172 |
| 2021/0224640 | A1* | 7/2021 | Nakahara | G06N 3/063 |
| 2021/0264599 | A1* | 8/2021 | Gong | G06V 10/82 |
| 2021/0279950 | A1* | 9/2021 | Phalak | G06F 18/2431 |
| 2021/0287070 | A1* | 9/2021 | Chen | G06N 3/045 |
| 2021/0374936 | A1* | 12/2021 | Koopman | G06N 3/08 |
| 2022/0036562 | A1* | 2/2022 | Wu | G06T 7/11 |
| 2022/0058429 | A1* | 2/2022 | Zou | G06V 10/761 |
| 2022/0092789 | A1* | 3/2022 | Li | G06N 3/084 |
| 2022/0198209 | A1* | 6/2022 | Spears | G06V 10/454 |
| 2022/0253506 | A1* | 8/2022 | Ahmadi | G06F 17/153 |
| 2022/0292806 | A1* | 9/2022 | Su | G06N 3/04 |
| 2023/0076266 | A1* | 3/2023 | Ying | G06V 10/40 |
| 2023/0222621 | A1* | 7/2023 | Vaghani | G06F 3/0626 |
| | | | | 382/305 |
| 2023/0377155 | A1* | 11/2023 | Raharja | G06T 7/0012 |
| 2023/0410496 | A1* | 12/2023 | Yao | G06V 10/82 |
| 2024/0005649 | A1* | 1/2024 | Yao | G06N 3/08 |

OTHER PUBLICATIONS

Kuo-Wei Chang et al., Efficient Accelerator for Dilated and Transposed Convolution with Decomposition, 2020 IEEE International Symposium on Circuits and Systems (ISCAS), 2020.

* cited by examiner

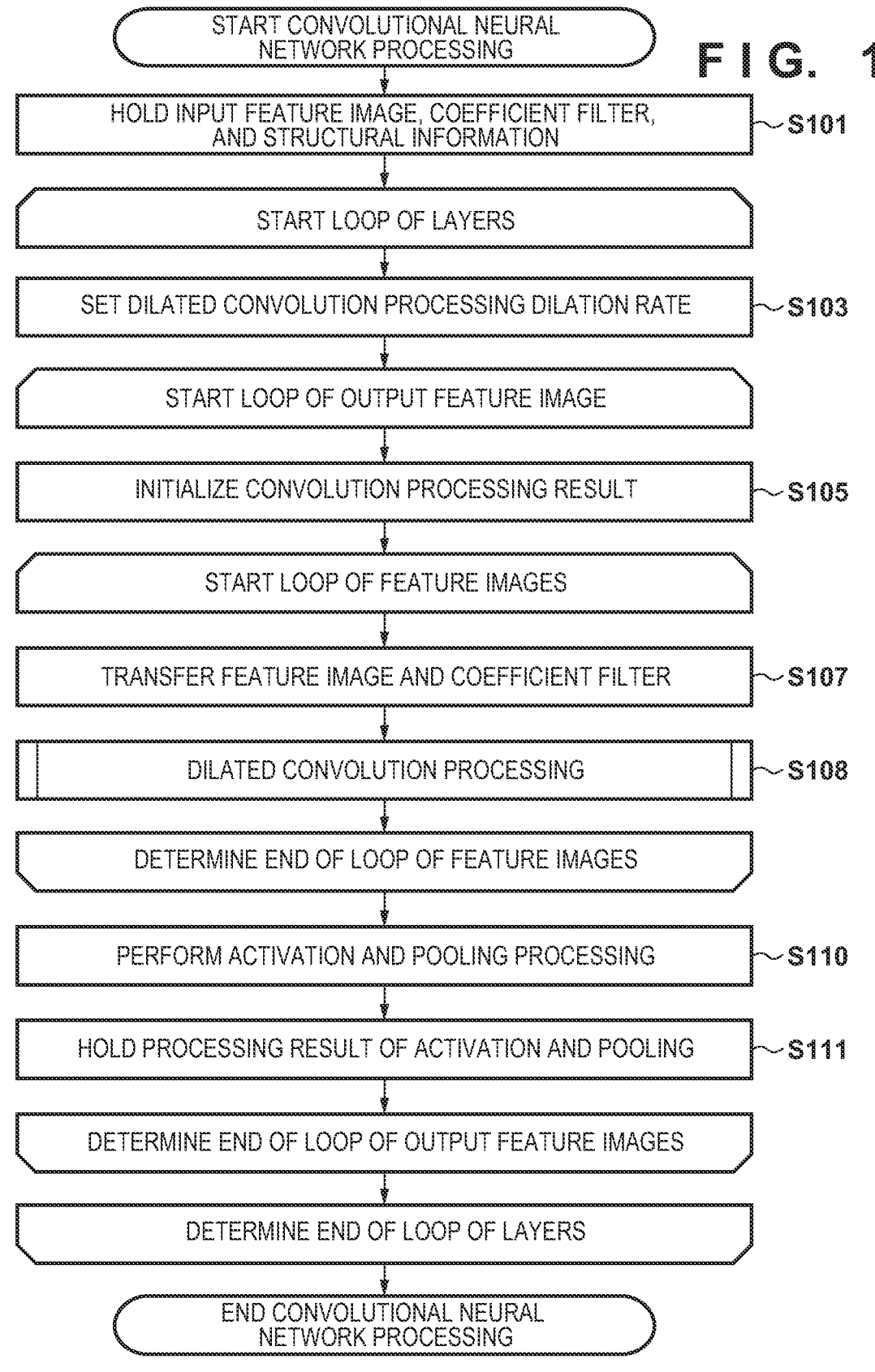

FIG. 1

START CONVOLUTIONAL NEURAL NETWORK PROCESSING

HOLD INPUT FEATURE IMAGE, COEFFICIENT FILTER, AND STRUCTURAL INFORMATION ~S101

START LOOP OF LAYERS

SET DILATED CONVOLUTION PROCESSING DILATION RATE ~S103

START LOOP OF OUTPUT FEATURE IMAGE

INITIALIZE CONVOLUTION PROCESSING RESULT ~S105

START LOOP OF FEATURE IMAGES

TRANSFER FEATURE IMAGE AND COEFFICIENT FILTER ~S107

DILATED CONVOLUTION PROCESSING ~S108

DETERMINE END OF LOOP OF FEATURE IMAGES

PERFORM ACTIVATION AND POOLING PROCESSING ~S110

HOLD PROCESSING RESULT OF ACTIVATION AND POOLING ~S111

DETERMINE END OF LOOP OF OUTPUT FEATURE IMAGES

DETERMINE END OF LOOP OF LAYERS

END CONVOLUTIONAL NEURAL NETWORK PROCESSING

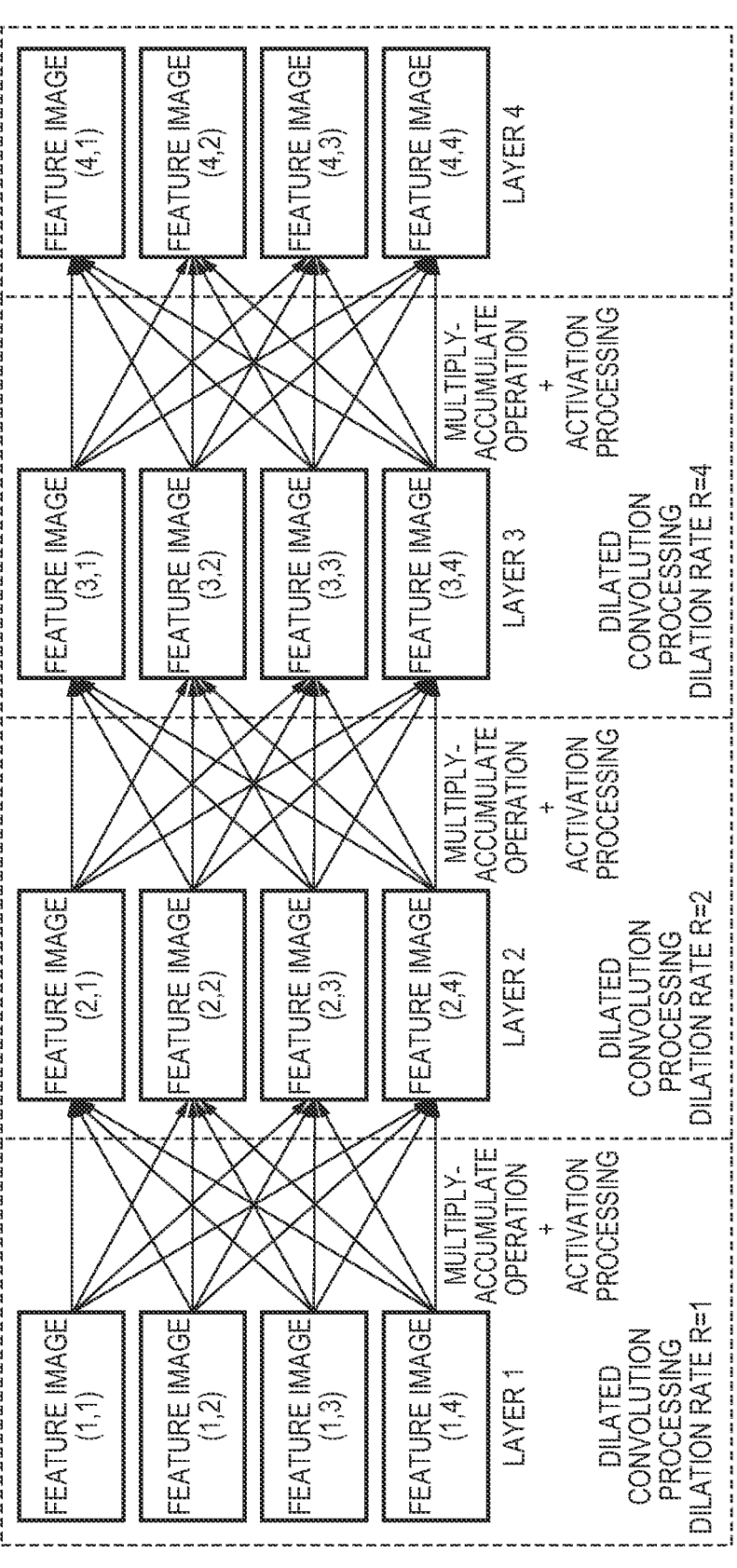
F I G. 2

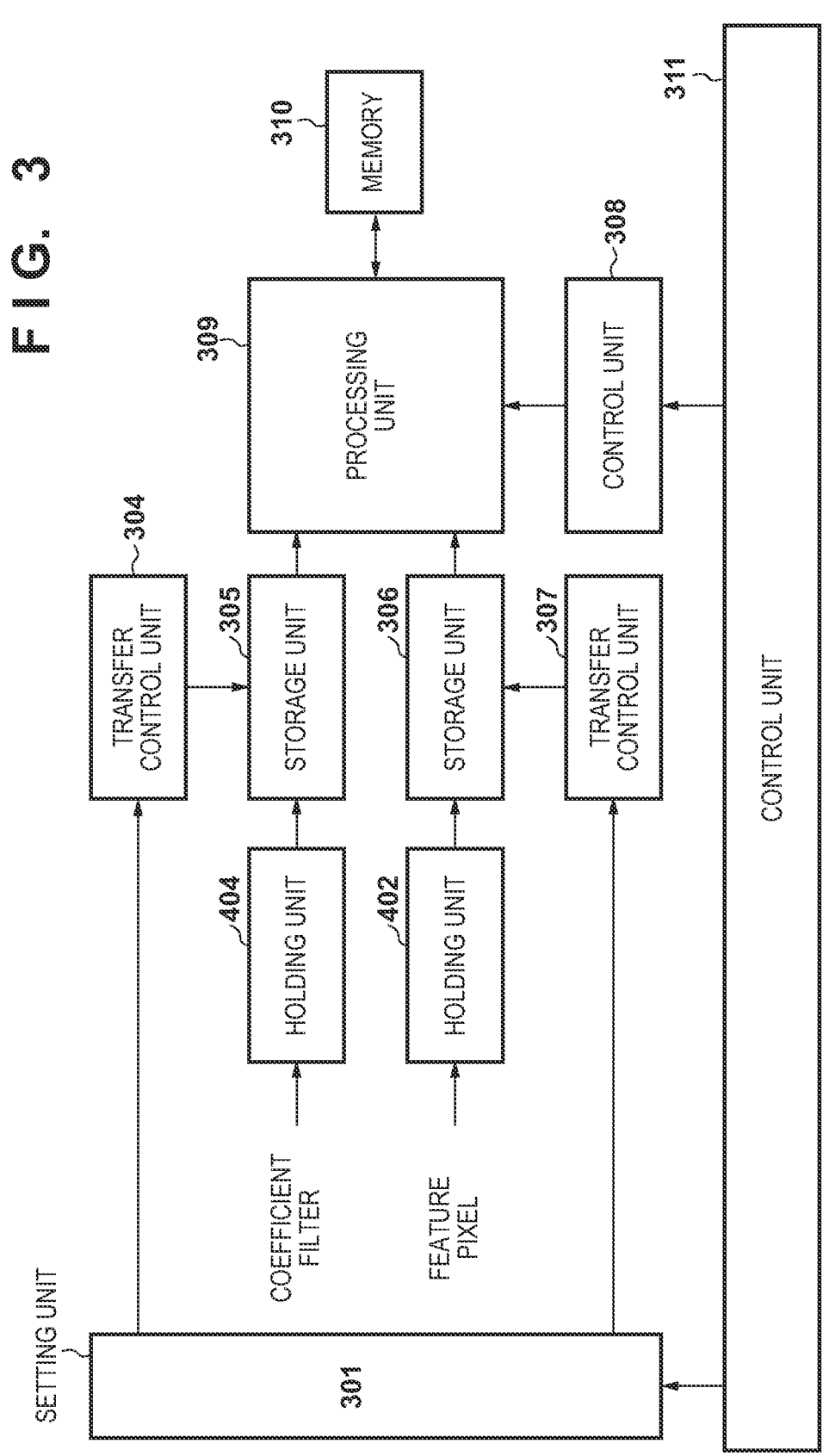
F I G. 3

F I G. 4
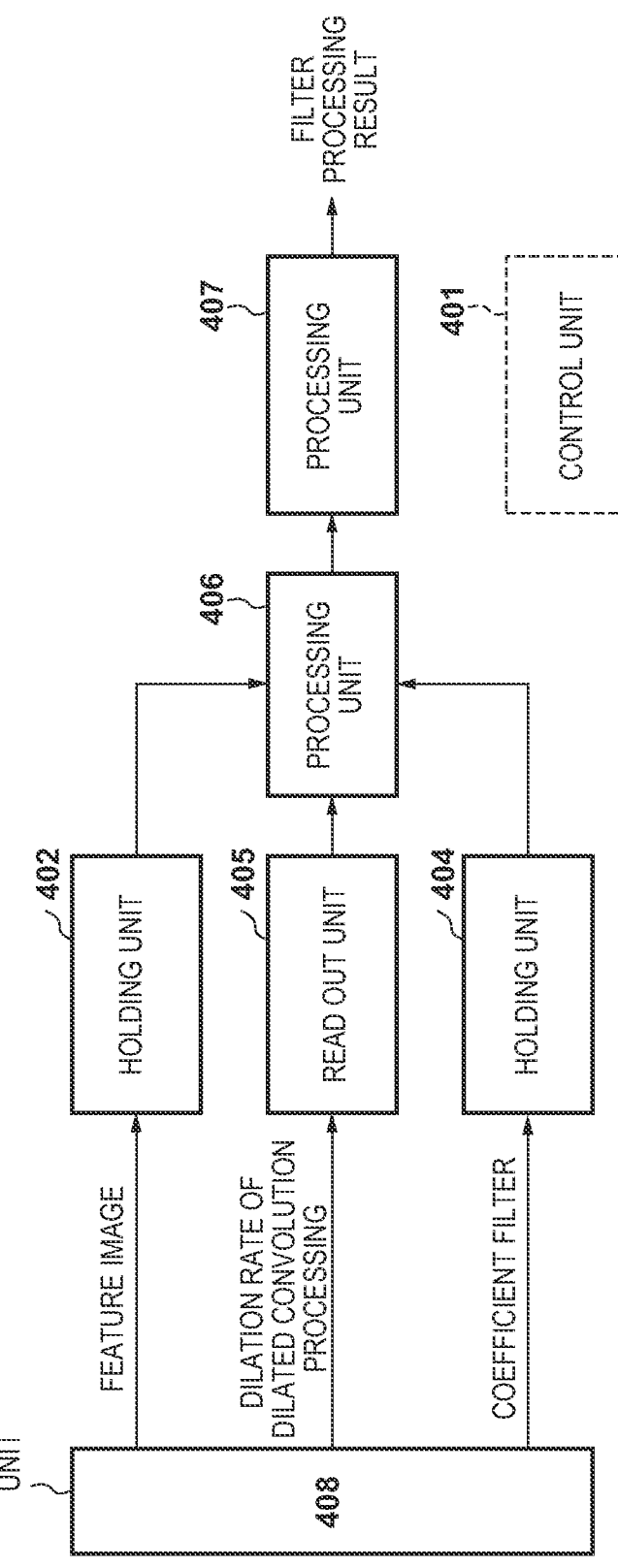

FIG. 9
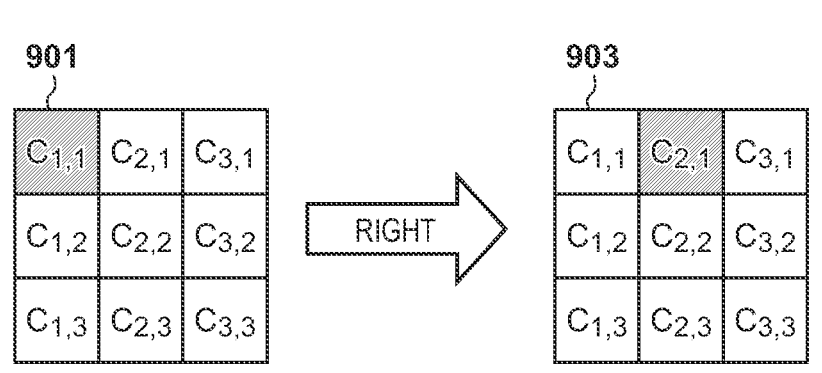
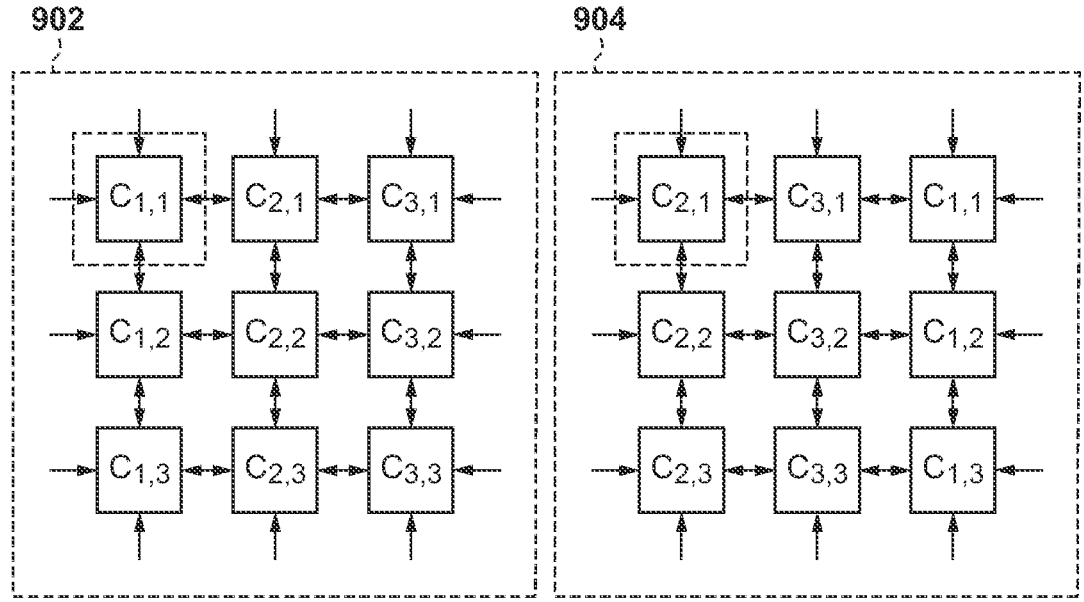

1001

PIXEL TRANSFER PATTERN

| m | 1 | 2 | 3 | 4 | 5 | 6 | 7 | 8 | 9 |
|---|---|---|---|---|---|---|---|---|---|
| $P_D(m)$ | 0 | 0 | 0 | 1 | 2 | 2 | 1 | 0 | 0 |
| $Ix(P_D(m))$ | 0 | 2 | 2 | 0 | -2 | -2 | 0 | 2 | 2 |
| $Iy(P_D(m))$ | 0 | 0 | 0 | 2 | 0 | 0 | 2 | 0 | 0 |
| DIRECTION | NONE | RIGHT | RIGHT | DOWN | LEFT | LEFT | DOWN | RIGHT | RIGHT |
| $Dx(m)$ | 1 | 3 | 5 | 5 | 3 | 1 | 1 | 3 | 5 |
| $Dy(m)$ | 1 | 1 | 1 | 3 | 3 | 3 | 5 | 5 | 5 |

1002

PIXEL TRANSFER DIRECTION

START POSITION

1003

FILTER COEFFICIENT TRANSFER PATTERN

| m | 1 | 2 | 3 | 4 | 5 | 6 | 7 | 8 | 9 |
|---|---|---|---|---|---|---|---|---|---|
| $P_C(m)$ | 0 | 0 | 0 | 1 | -1 | -1 | 0 | 0 | 0 |
| $Jx(P_C(m))$ | 0 | 1 | 1 | 0 | -1 | -1 | 0 | 1 | 1 |
| $Jy(P_C(m))$ | 0 | 0 | 0 | 1 | 0 | 0 | 1 | 0 | 0 |
| DIRECTION | NONE | RIGHT | RIGHT | DOWN | LEFT | LEFT | DOWN | RIGHT | RIGHT |
| $Cx(m)$ | 1 | 2 | 3 | 3 | 2 | 1 | 1 | 2 | 3 |
| $Cy(m)$ | 1 | 1 | 1 | 2 | 2 | 2 | 3 | 3 | 3 |

1004

FILTER COEFFICIENT TRANSFER DIRECTION

START POSITION

Figure 11B:
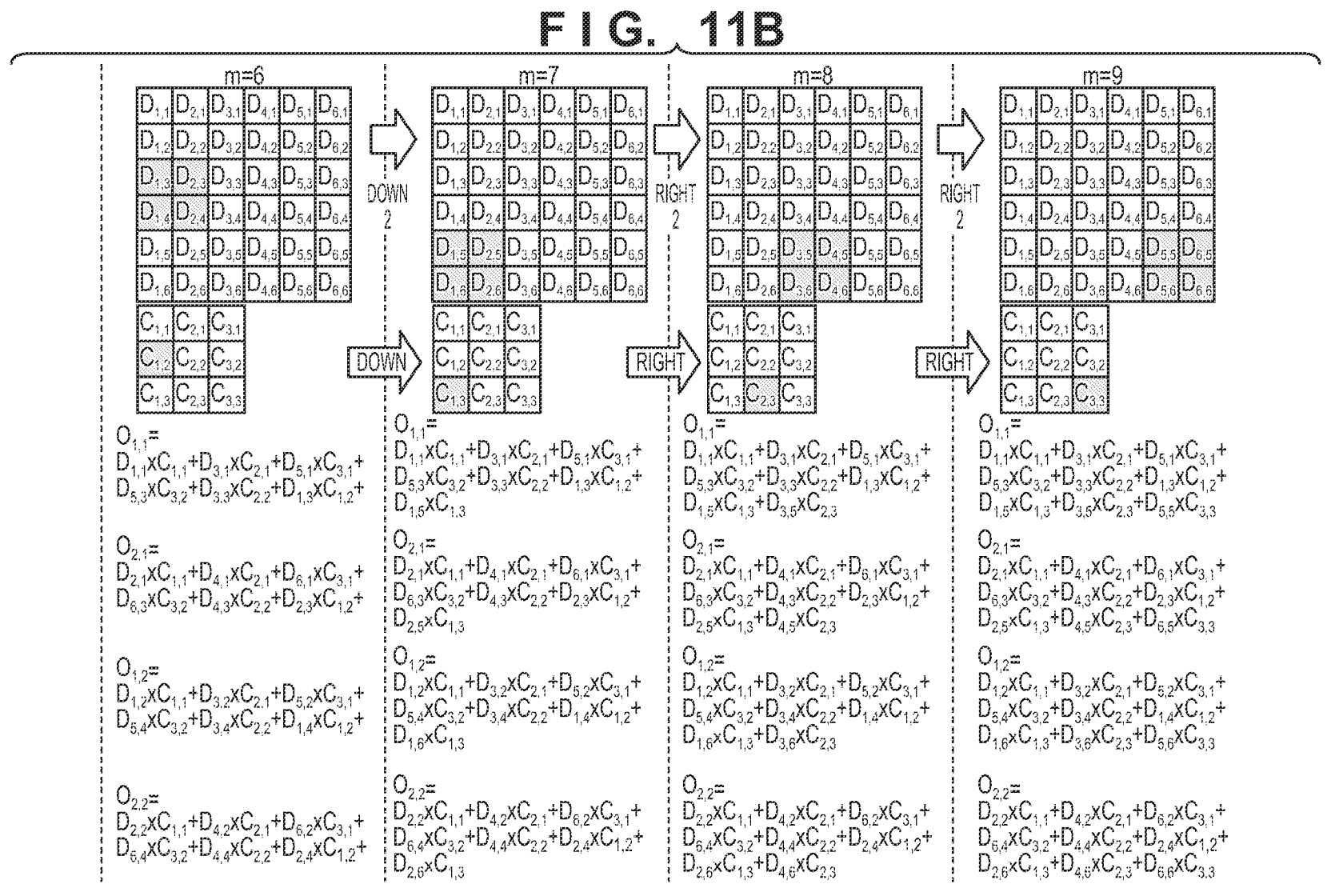

$$O_{1,1}=$$
$$D_{1,1}\times C_{1,1}+D_{3,1}\times C_{2,1}+D_{5,1}\times C_{3,1}+$$
$$D_{5,3}\times C_{3,2}+D_{3,3}\times C_{2,2}+D_{1,3}\times C_{1,2}+$$
$$D_{1,5}\times C_{1,3}$$

$$O_{2,1}=$$
$$D_{2,1}\times C_{1,1}+D_{4,1}\times C_{2,1}+D_{6,1}\times C_{3,1}+$$
$$D_{6,3}\times C_{3,2}+D_{4,3}\times C_{2,2}+D_{2,3}\times C_{1,2}+$$
$$D_{2,5}\times C_{1,3}$$

$$O_{1,2}=$$
$$D_{1,1}\times C_{1,1}+D_{3,2}\times C_{2,1}+D_{5,2}\times C_{3,1}+$$
$$D_{5,4}\times C_{3,2}+D_{3,4}\times C_{2,2}+D_{1,4}\times C_{1,2}+$$
$$D_{1,6}\times C_{1,3}$$

$$O_{2,2}=$$
$$D_{2,2}\times C_{1,1}+D_{4,2}\times C_{2,1}+D_{6,2}\times C_{3,1}+$$
$$D_{6,4}\times C_{3,2}+D_{4,4}\times C_{2,2}+D_{2,4}\times C_{1,2}+$$
$$D_{2,6}\times C_{1,3}$$

m=7

$$O_{1,1}=$$
$$D_{1,1}\times C_{1,1}+D_{3,1}\times C_{2,1}+D_{5,1}\times C_{3,1}+$$
$$D_{5,3}\times C_{3,2}+D_{3,3}\times C_{2,2}+D_{1,3}\times C_{1,2}+$$
$$D_{1,5}\times C_{1,3}$$

$$O_{2,1}=$$
$$D_{2,1}\times C_{1,1}+D_{4,1}\times C_{2,1}+D_{6,1}\times C_{3,1}+$$
$$D_{6,3}\times C_{3,2}+D_{4,3}\times C_{2,2}+D_{2,3}\times C_{1,2}+$$
$$D_{2,5}\times C_{1,3}$$

$$O_{1,2}=$$
$$D_{1,2}\times C_{1,1}+D_{3,2}\times C_{2,1}+D_{5,2}\times C_{3,1}+$$
$$D_{5,4}\times C_{3,2}+D_{3,4}\times C_{2,2}+D_{1,4}\times C_{1,2}+$$
$$D_{1,6}\times C_{1,3}$$

$$O_{2,2}=$$
$$D_{2,2}\times C_{1,1}+D_{4,2}\times C_{2,1}+D_{6,2}\times C_{3,1}+$$
$$D_{6,4}\times C_{3,2}+D_{4,4}\times C_{2,2}+D_{2,4}\times C_{1,2}+$$
$$D_{2,6}\times C_{1,3}$$

m=8

$$O_{1,1}=$$
$$D_{1,1}\times C_{1,1}+D_{3,1}\times C_{2,1}+D_{5,1}\times C_{3,1}+$$
$$D_{5,3}\times C_{3,2}+D_{3,3}\times C_{2,2}+D_{1,3}\times C_{1,2}+$$
$$D_{1,5}\times C_{1,3}+D_{3,5}\times C_{2,3}$$

$$O_{2,1}=$$
$$D_{2,1}\times C_{1,1}+D_{4,1}\times C_{2,1}+D_{6,1}\times C_{3,1}+$$
$$D_{6,3}\times C_{3,2}+D_{4,3}\times C_{2,2}+D_{2,3}\times C_{1,2}+$$
$$D_{2,5}\times C_{1,3}+D_{4,5}\times C_{2,3}$$

$$O_{1,2}=$$
$$D_{1,2}\times C_{1,1}+D_{3,2}\times C_{2,1}+D_{5,2}\times C_{3,1}+$$
$$D_{5,4}\times C_{3,2}+D_{3,4}\times C_{2,2}+D_{1,4}\times C_{1,2}+$$
$$D_{1,6}\times C_{1,3}+D_{3,6}\times C_{2,3}$$

$$O_{2,2}=$$
$$D_{2,2}\times C_{1,1}+D_{4,2}\times C_{2,1}+D_{6,2}\times C_{3,1}+$$
$$D_{6,4}\times C_{3,2}+D_{4,4}\times C_{2,2}+D_{2,4}\times C_{1,2}+$$
$$D_{2,6}\times C_{1,3}+D_{4,6}\times C_{2,3}$$

m=9

$$O_{1,1}=$$
$$D_{1,1}\times C_{1,1}+D_{3,1}\times C_{2,1}+D_{5,1}\times C_{3,1}+$$
$$D_{5,3}\times C_{3,2}+D_{3,3}\times C_{2,2}+D_{1,3}\times C_{1,2}+$$
$$D_{1,5}\times C_{1,3}+D_{3,5}\times C_{2,3}+D_{5,5}\times C_{3,3}$$

$$O_{2,1}=$$
$$D_{2,1}\times C_{1,1}+D_{4,1}\times C_{2,1}+D_{6,1}\times C_{3,1}+$$
$$D_{6,3}\times C_{3,2}+D_{4,3}\times C_{2,2}+D_{2,3}\times C_{1,2}+$$
$$D_{2,5}\times C_{1,3}+D_{4,5}\times C_{2,3}+D_{6,5}\times C_{3,3}$$

$$O_{1,2}=$$
$$D_{1,2}\times C_{1,1}+D_{3,2}\times C_{2,1}+D_{5,2}\times C_{3,1}+$$
$$D_{5,4}\times C_{3,2}+D_{3,4}\times C_{2,2}+D_{1,4}\times C_{1,2}+$$
$$D_{1,6}\times C_{1,3}+D_{3,6}\times C_{2,3}+D_{5,6}\times C_{3,3}$$

$$O_{2,2}=$$
$$D_{2,2}\times C_{1,1}+D_{4,2}\times C_{2,1}+D_{6,2}\times C_{3,1}+$$
$$D_{6,4}\times C_{3,2}+D_{4,4}\times C_{2,2}+D_{2,4}\times C_{1,2}+$$
$$D_{2,6}\times C_{1,3}+D_{4,6}\times C_{2,3}+D_{6,6}\times C_{3,3}$$

F I G. 12
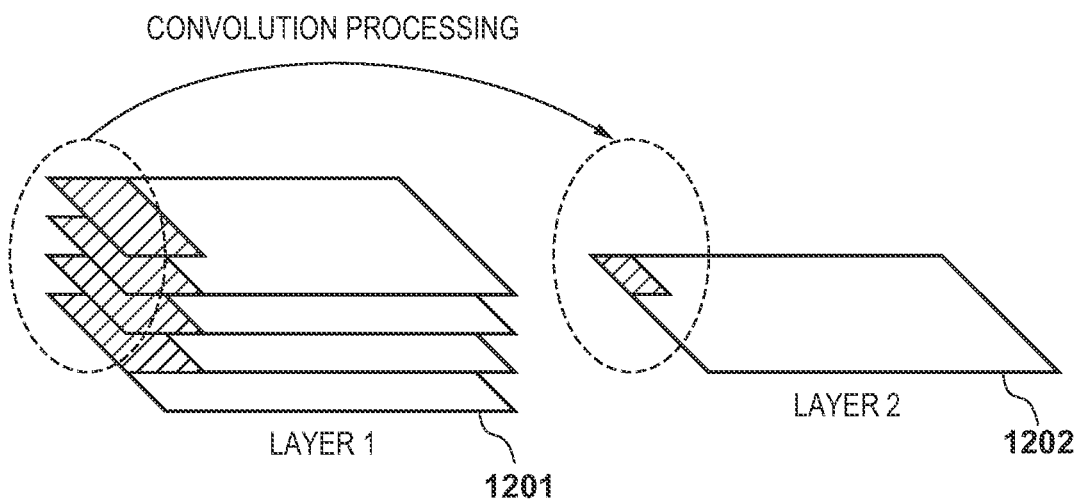
CONVOLUTION PROCESSING
LAYER 1
1201
LAYER 2
1202

F I G. 13

1401
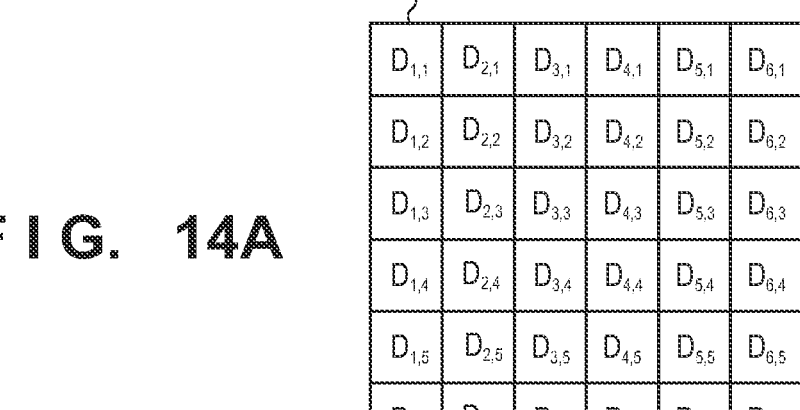
PIXEL SET
F I G.    14A
1402
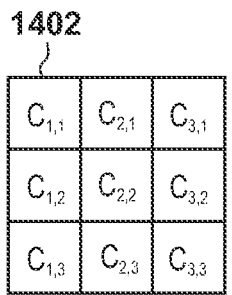
COEFFICIENT FILTER
F I G.    14B
1403
$O_{1,1}$ $O_{2,1}$
$O_{1,2}$ $O_{2,2}$
OUTPUT RESULT
F I G.    14C F I G. 15
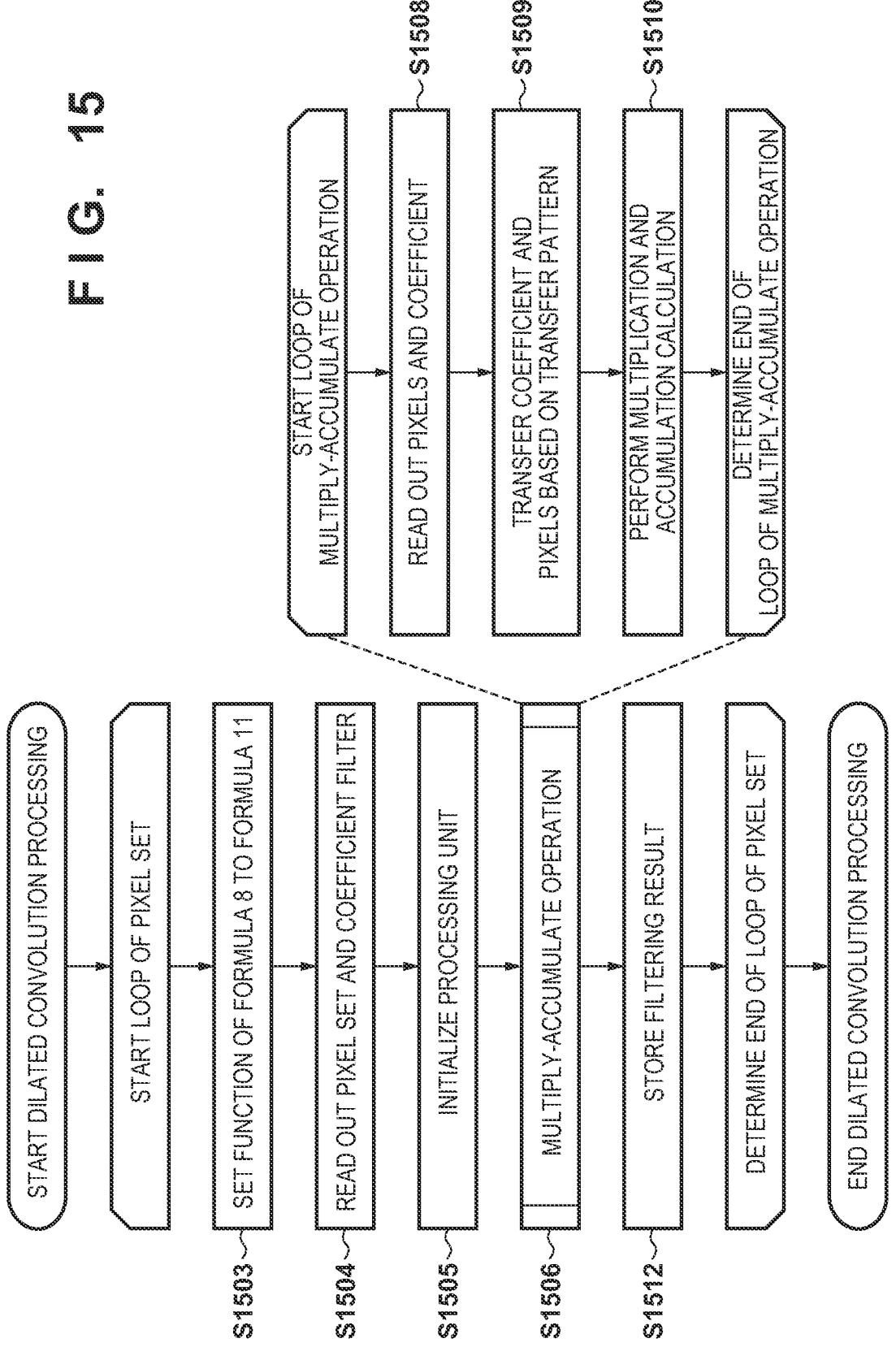

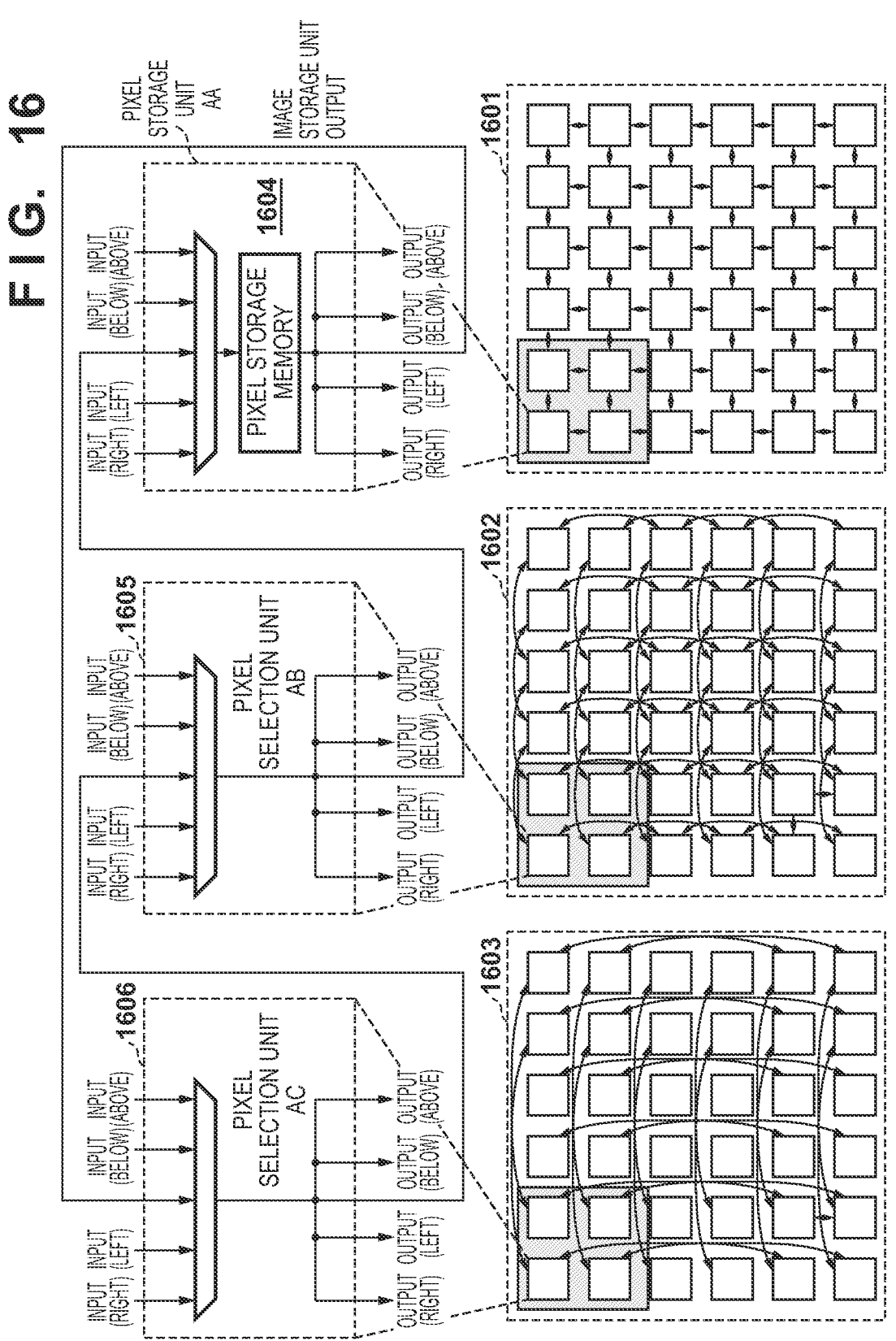
F I G. 16

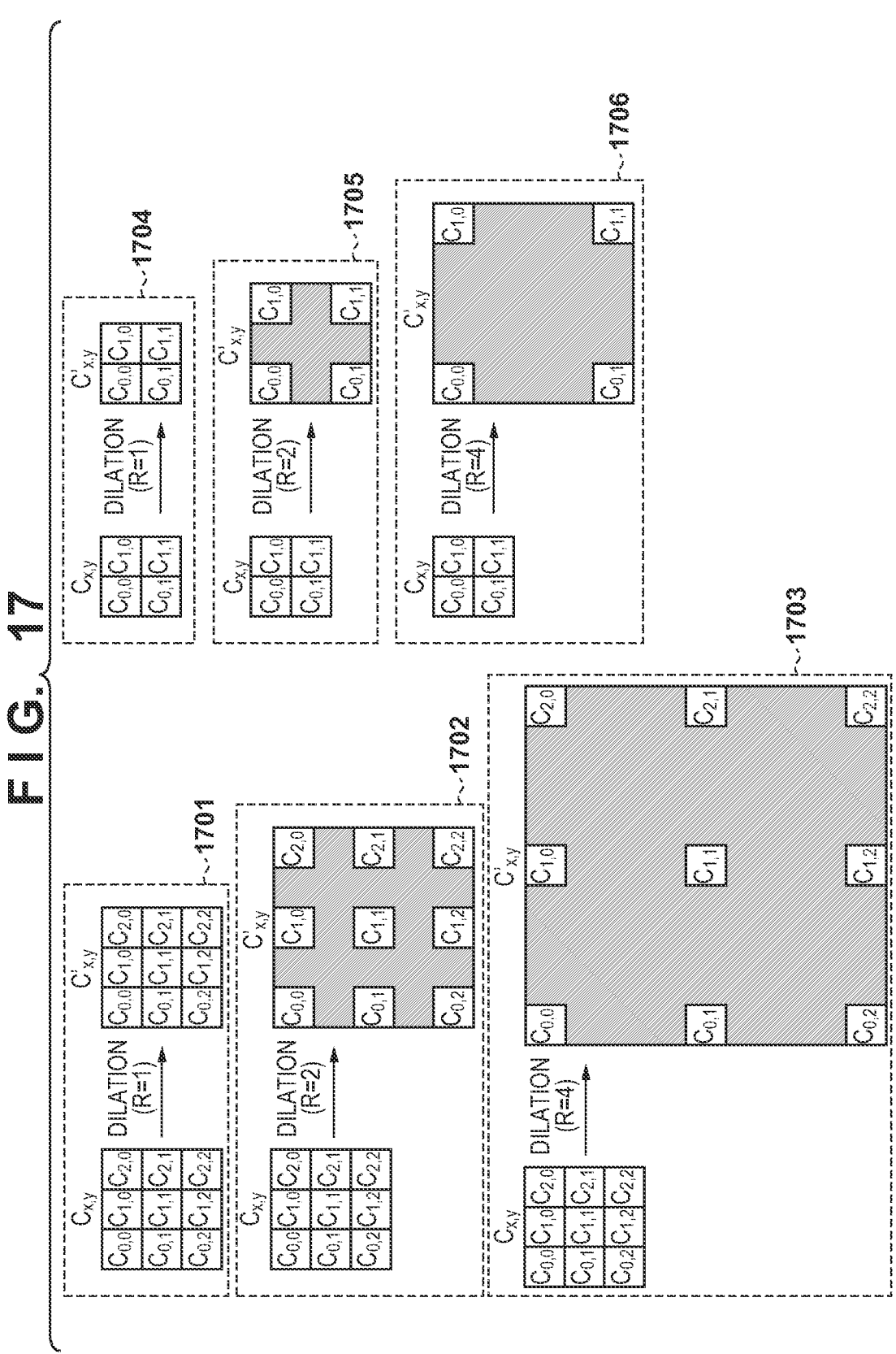
F I G. 17

F I G.  18
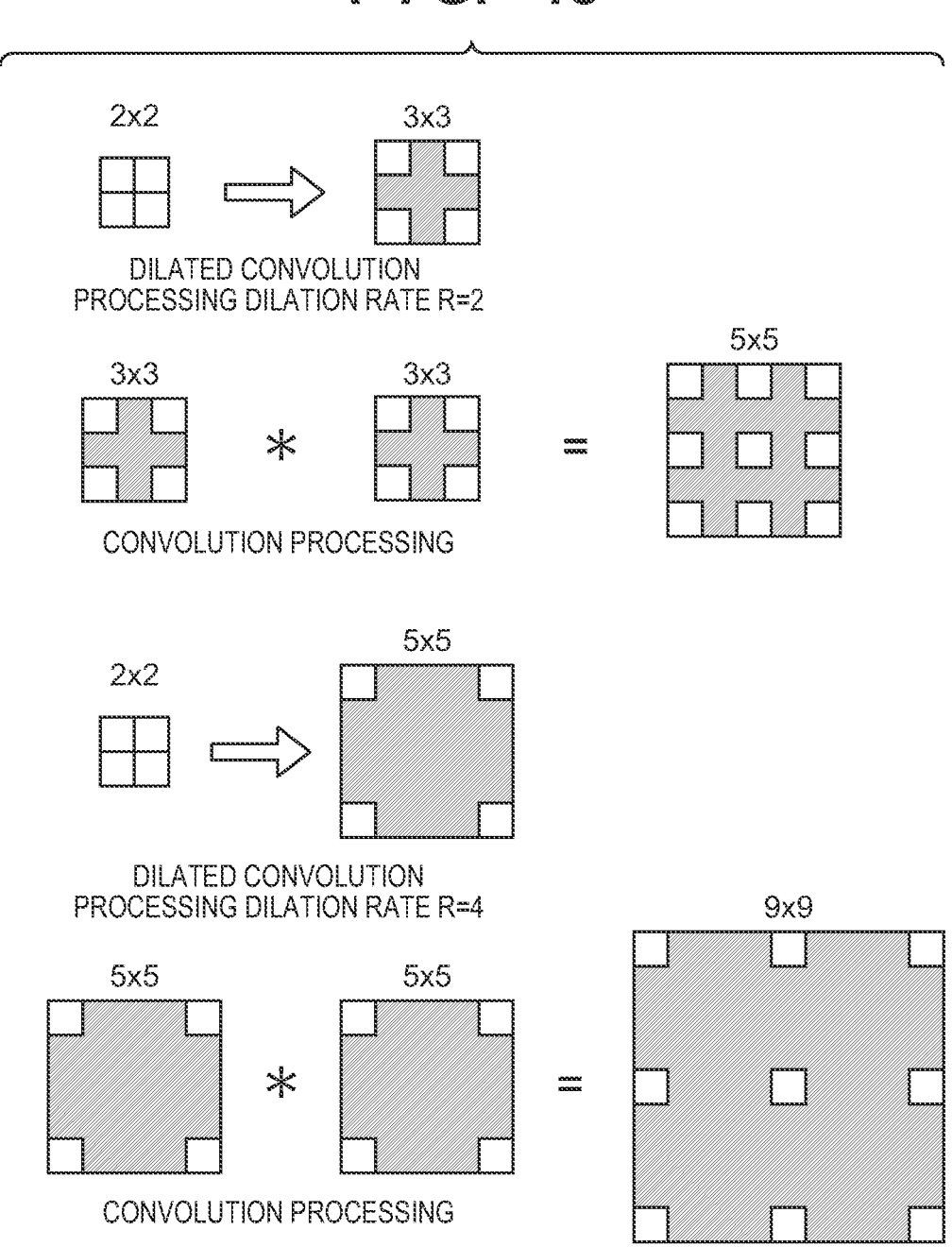

F I G.  19
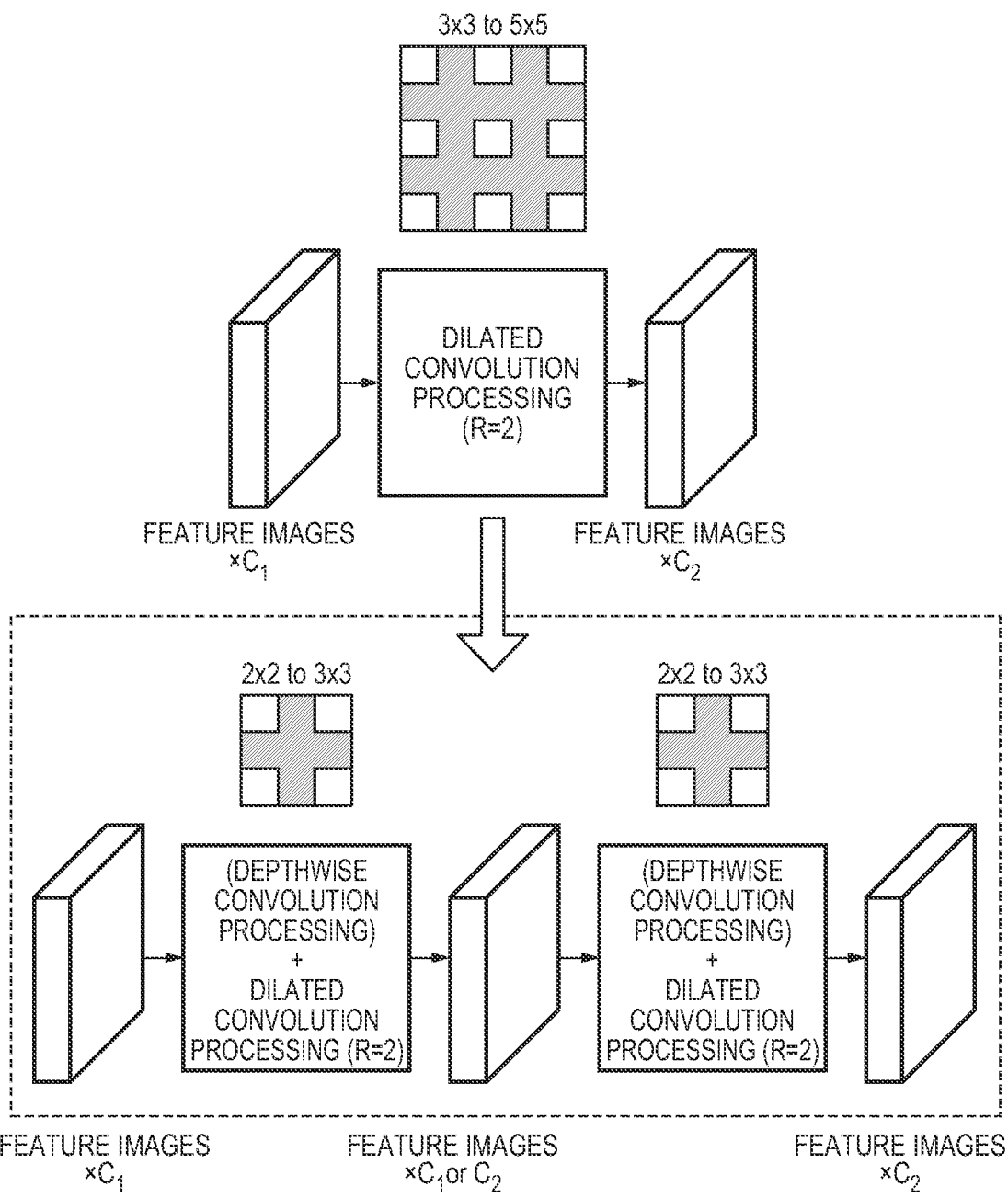

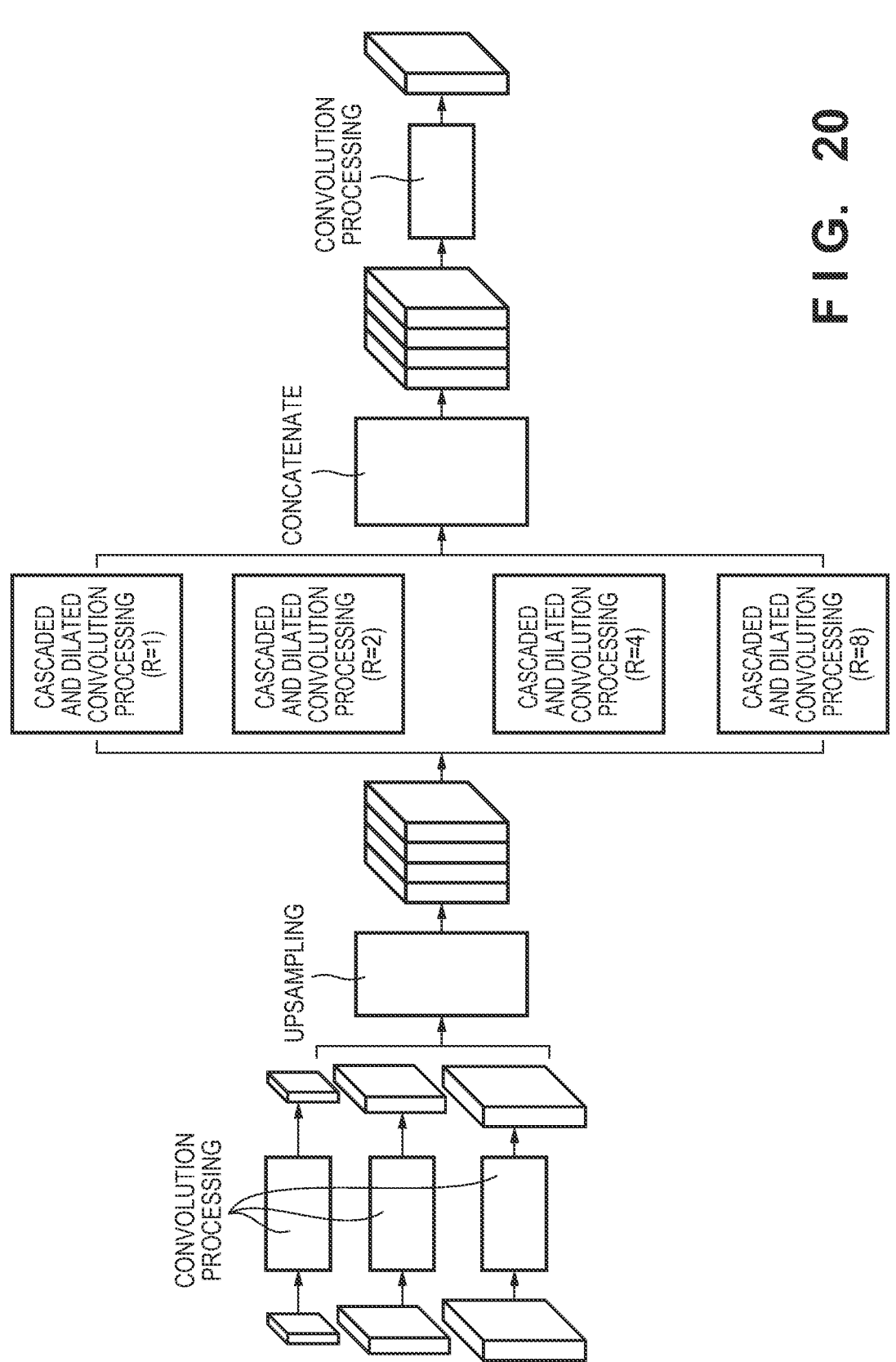
F I G. 20

FIG. 21

IMAGE PROCESSING APPARATUS, IMAGE PROCESSING METHOD, AND NON-TRANSITORY COMPUTER-READABLE STORAGE MEDIUM

BACKGROUND

Field of the Disclosure

The present disclosure relates to convolution processing.

Description of the Related Art

With recent advancements in deep learning, the accuracy of image recognition is also improving. A convolutional neural network (CNN) is a known technique used in deep learning.

In a CNN, a plurality of layers are connected in a hierarchical manner, with a plurality of feature image existing in each layer. In the example of a CNN configuration illustrated in FIG. 2, the number of layers is four and the number of feature images in each layer is four. In a CNN, convolution processing is executed using a learned coefficient (weighting coefficient) and the pixels (feature data) of the feature images. Convolution processing is a multiply-accumulate operation including a plurality of multiplications and a cumulative sum. Each arrow illustrated in FIG. 2 indicates a multiply-accumulate operation.

Feature images of a current layer are calculated using feature images of a preceding layer and filter coefficients corresponding to the preceding layer. To calculate one feature image of the current layer, the information of a plurality of feature images of the preceding layer is required. The multiply-accumulate operation for calculating a feature image of the current layer is performed as follows (Formula 1).

$$O_{i,j}(n) = \sum_{m=1}^{M} \sum_{x=0}^{X-1} \sum_{y=0}^{Y-1} (I_{i+x,j+y}(m) \times C_{x,y}(m, n)) \tag{Formula 1}$$

Herein, n is an index of a feature image in the current layer, and m (m=1 to M) is an index of a feature image in the preceding layer. $O_{i,j}(n)$ represents feature data (a multiply-accumulate operation result) corresponding to a position (i,j) in a feature image with an index of n in the current layer. $I_{i,j}(m)$ represents feature data corresponding to a position (i,j) in a feature image I(m) with an index of m in the preceding layer. $C_{x,y}(m,n)$ represents coefficients between a feature image with an index of n in the current layer and feature data corresponding to a position (x,y) in a feature image with an index of m in the preceding layer. In Formula 1, there are (X×Y) coefficients ($C_{0,0}$ (m,n) to $C_{X-1,Y-1}$(m,n)), and the coefficients differ for each feature image. X and Y are variables representing a reference range. The multiply-accumulate operation for calculating the feature data of the current layer is performed (M×X×Y) times.

After the multiply-accumulate operation (filter processing) described above has been executed, based on the network structure of a CNN, the feature images of the current layer are calculated by executing processing such as activation processing and pooling using a multiply-accumulate operation result $O_{i,j}(n)$.

CNNs are also used in applications such as image segmentation and the like. Dilated convolution described in Huikai Wu, Junge Zhang, Kaiqi Huang, Kongming Liang, and Yizhou Yu, "FastFCN: Rethinking dilated convolution in the backbone for semantic segmentation," 2019, CoRR, abs/1903.11816 is a technique for improving the accuracy of image segmentation with a lost calculation cost. When performing dilated convolution, a multiply-accumulate operation is performed as follows (Formula 2).

$$O_{i,j}(n) = \sum_{m=1}^{M} \sum_{x=0}^{X-1} \sum_{y=0}^{Y-1} (I_{i+Rx,j+Ry}(m) \times C_{x,y}(m, n)) \tag{Formula 2}$$

Herein, the variable R is the dilation rate of the dilated convolution processing. When the variable R is 1, Formula 2 is the same as Formula 1. The larger the value of the variable R, the wider the reference range in the feature image of the preceding layer. After dilation, the reference range changes from (X×Y) to [R×(X−1)+1]×[R×(Y−1)+1]. In this operation, the processing is performed without skipping coefficients, and to process feature data of a feature image at intervals of (R−1) data, however, feature data in the horizontal direction or the vertical direction are referred to as they are skipped.

A multiply-accumulate operation in which a coefficient (weighting coefficient) C used in the multiply-accumulate operation (Formula 2) in the filter processing is placed with a coefficient C' in an extended (dilated) filter as described below (in Formula 4) is performed as follows (Formula 3).

$$O_{i,j}(n) = \sum_{m=1}^{M} \sum_{x=0}^{R\times(X-1)} \sum_{y=0}^{R\times(Y-1)} \left(I_{i+x,j+y}(m) \times C'_{x,y}(m, n)\right) \tag{Formula 3}$$

Formula (3) is as described above in terms of the variables in common with Formula (1) and Formula (2), and thus a description thereof is omitted. The coefficient $C'_{x,y}(m,n)$ is represented by Formula 4 below.

$$C'_{x,y}(m, n) = \begin{cases} C_{x,y}(m, n), & \text{if } \left\lfloor \frac{x}{R} \right\rfloor = \frac{x}{R}, \left\lfloor \frac{y}{R} \right\rfloor = \frac{y}{R} \\ 0, & \text{otherwise} \end{cases} \tag{Formula 4}$$

When x and y are multiples of R, the value of the coefficient $C'_{x,y}(m,n)$ is the same as that of the coefficient $C_{x/R,y/R}(m,n)$ and is a significant value (effective coefficient). On the other hand, if the values of x and y are not multiples of R, the value of the coefficient $C'_{x,y}(m, n)$ is 0, and this means that the calculation will be omitted. In this case, $$\lfloor \cdot \rfloor$$

is a floor function that outputs a maximum integer equal to or less than X. In a CNN, multiply-accumulate operations are performed many times. Thus, in a case where the CNN is applied to a portable terminal or an embedded system such as an in-vehicle device, it is necessary to reduce the transfer amounts of feature data and coefficients, efficiently perform multiply-accumulate operations, and shorten the overall processing time. In US 2020/0410036 and U.S. Ser. No. 10/861,123, a configuration is described that processes a plurality of feature data in parallel.

Dilated convolution can achieve high recognition accuracy with a low calculation cost, but because the coordinates of the reference data and the address of the memory or the like are not continuous, the processing efficiency of the hardware may be decreased.

In the technique described in US 2020/0410036, output data is calculated in parallel using a systolic array. The dilated convolution described in Huikai Wu, Junge Zhang, Kaiqi Huang, Kongming Liang, and Yizhou Yu, "FastFCN: Rethinking dilated convolution in the backbone for semantic segmentation," 2019, CoRR, abs/1903.11816 can be performed referencing a network parameter and using a zero coefficient represented by Formula 4, however referencing while skipping feature data of feature image I(m) cannot be performed.

In the technique described in U.S. Ser. No. 10/861,123, output data is calculated in parallel using a coefficient common among different feature data. In a case where the dilated convolution described in Huikai Wu, Junge Zhang, Kaiqi Huang, Kongming Liang, and Yizhou Yu, "FastFCN: Rethinking dilated convolution in the backbone for semantic segmentation," 2019, CoRR, abs/1903.11816 is performed, a zero coefficient represented by Formula 4 can be used. In a case where each pixel and each coefficient are read out in one action, dilated convolution processing can be efficiently performed. However, because referencing cannot be performed while skipping feature data of a feature image I(m), all of the zero coefficient processing cannot be omitted.

SUMMARY

The present disclosure provides technology for reducing the processing time by skipping pixels in a feature image when referencing when performing a convolution operation.

According to the first aspect of the present disclosure, there is provided an image processing apparatus, comprising: a first obtaining unit configured to obtain a pixel from a feature image; and a calculating unit configured to perform a convolution operation based on a pixel obtained by the first obtaining unit, wherein the first obtaining unit is capable of obtaining non-adjacent pixels from the feature image.

According to the second aspect of the present disclosure, there is provided an image processing method, comprising: obtaining a pixel from a feature image; and performing a convolution operation based on the obtained pixel, wherein in the obtaining, non-adjacent pixels are able to be obtained from the feature image.

According to the third aspect of the present disclosure, there is provided a non-transitory computer-readable storage medium storing a computer program for causing a computer to function as a first obtaining unit configured to obtain a pixel from a feature image; and a calculating unit configured to perform a convolution operation based on a pixel obtained by the first obtaining unit, wherein the first obtaining unit is capable of obtaining non-adjacent pixels from the feature image.

Further features of the present disclosure will become apparent from the following description of exemplary embodiments with reference to the attached drawings.

BRIEF DESCRIPTION OF THE DRAWINGS

FIG. 1 is a flowchart of the operations of a CNN processing unit 1305.

FIG. 2 is a diagram illustrating an example configuration of a CNN.

FIG. 3 is a block diagram illustrating an example configuration of a processing unit 406.

FIG. 4 is a block diagram illustrating an example configuration of the CNN processing unit 1305.

FIG. 9 is a diagram illustrating the corresponding relationship between filter coefficients and positions.

FIG. 11A is a diagram illustrating an example of pixel transfer and coefficient transfer.

FIG. 11B is a diagram illustrating an example of pixel transfer and coefficient transfer.

FIG. 12 is a diagram illustrating an example of CNN and convolution processing.

FIG. 13 is a block diagram illustrating an example hardware configuration of an image processing apparatus.

FIG. 14A is a diagram illustrating a pixel set, a coefficient filter, and a convolution processing result.

FIG. 14B is a diagram illustrating a pixel set, a coefficient filter, and a convolution processing result.

FIG. 14C is a diagram illustrating a pixel set, a coefficient filter, and a convolution processing result.

FIG. 15 is a flowchart illustrating the details of the processing of step S108.

FIG. 16 is a block diagram illustrating an example configuration of the storage unit 306.

FIG. 17 is a diagram illustrating an example of coefficient filter expansion.

FIG. 18 is a diagram illustrating an example of cascade-connected dilated convolution processing coefficient filters.

FIG. 19 is a diagram illustrating an example of cascade-connected dilated convolution processing applied to a convolutional neural network.

FIG. 20 is a diagram illustrating an example of a convolutional neural network for image segmentation processing.

FIG. 21 is a block diagram illustrating an example configuration of the CNN processing unit 1305.

DESCRIPTION OF THE EMBODIMENTS

Figure 5:
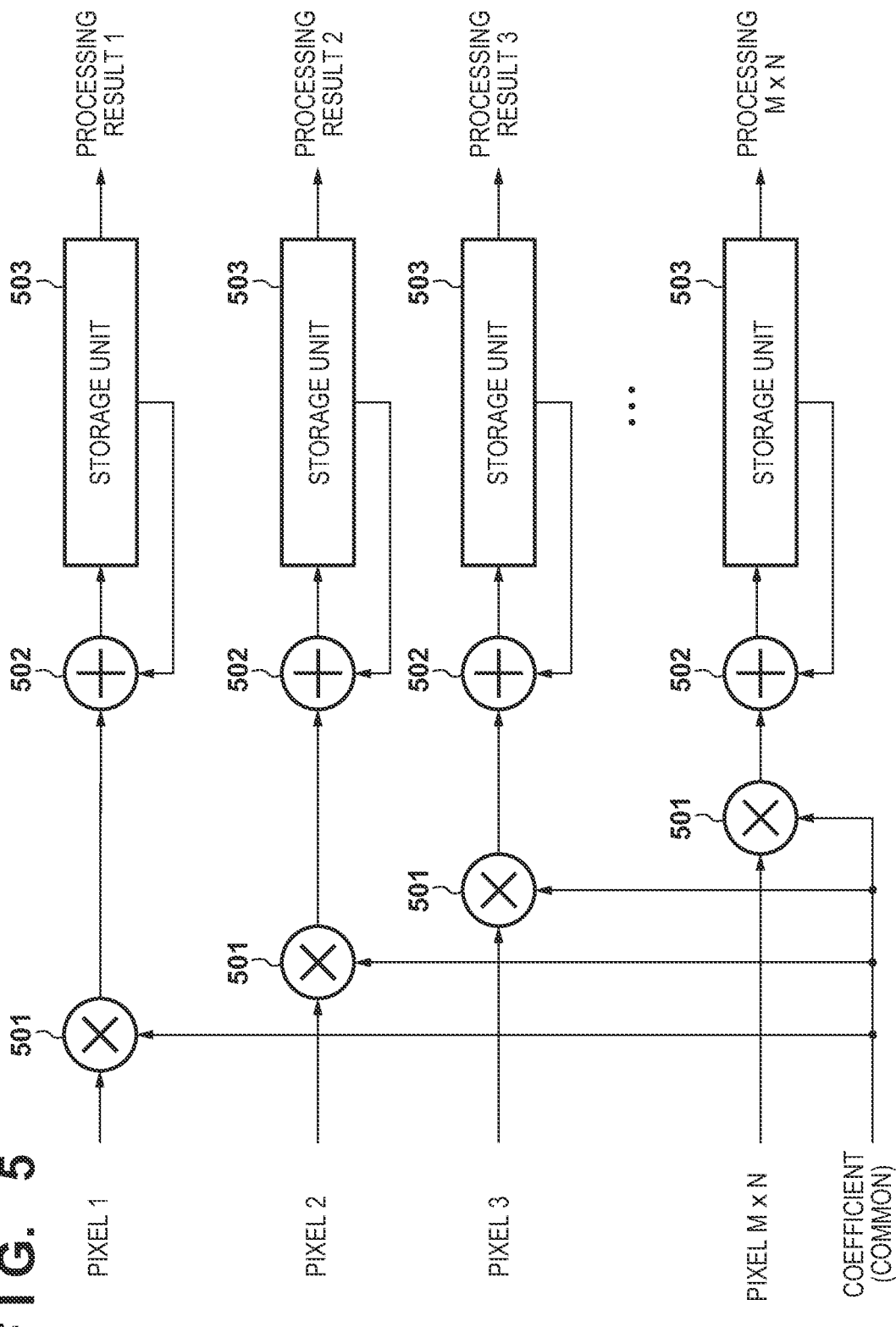
FIG. 5 is a diagram illustrating an example configuration of a processing unit 309.

Hereinafter, embodiments will be described in detail with reference to the attached drawings. Note, the following embodiments are not intended to limit the scope of the claimed disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

First Embodiment

First, a hardware configuration example of an image processing apparatus that performs a convolution operation in a hierarchical neural network (such as the CNN described above) will be described using the block diagram of FIG. 13. The image processing apparatus according to the present embodiment is applicable to a personal computer (PC), a tablet terminal apparatus, a smart phone, or other similar computer apparatus. Also, as long as the processing described below as being executed by the image processing apparatus can be executed, the configuration of the image processing apparatus is not limited to that illustrated in FIG. 13, and another configuration may be used.

An input unit 1301 is a user interface such as a keyboard, a mouse, or a touch panel. The user can input various instructions to a CPU 1306 by operating the input unit 1301. Note that the input unit 1301 is not limited to being included in the image processing apparatus.

A data storage unit 1302 is a large capacity information storage apparatus such as a hard disk drive. An operating system (OS), computer programs for executing or controlling, via the CPU 1306, processing described as being executed by the image processing apparatus, and data are stored in the data storage unit 1302. The computer programs and data stored in the data storage unit 1302 are loaded as appropriate on a RAM 1308 in accordance with control by the CPU 1306 and are the targets for processing by the CPU 1306.

Examples of the data storage unit 1302 include a flexible disk, a CD-ROM, a CD-R, a DVD, a memory card, a CF card, a smart medium, an SD card, a memory stick, a xD picture card, a USB memory, and other similar memory apparatuses.

Also, the data storage unit 1302 is not limited to being included in the image processing apparatus and may be provided on a network using a wired or wireless connection via a LAN, the Internet, or the like. In this case, the image processing apparatus accesses the data storage unit 1302 via a communication unit 1303 and reads and writes computer programs and data from/to the data storage unit 1302. The communication unit 1303 communicates data with an external apparatus via the network described above.

A display unit 1304 includes a liquid crystal screen or a touch panel screen and displays results of the processing by the CPU 1306 using images, characters, and the like. Note that the display unit 1304 is not limited to being included in the image processing apparatus. Also, the display unit 1304 may be a projecting apparatus such as a projector that projects images or characters. Furthermore, the input unit 1301 and the display unit 1304 may be integrally formed, forming a touch panel screen.

A CNN processing unit 1305 inputs a processing target image (input image) stored in the RAM 1308 into an input layer of the CNN, executes calculation processing at each layer of the CNN, and stores the calculation processing result in the RAM 1308 or the data storage unit 1302.

The CPU 1306 executes various processing using computer programs and data stored in the RAM 1308 and a ROM 1307. Accordingly, the CPU 1306 performs operation control of the entire image processing apparatus and executes or controls various processing described below as processing executed by the image processing apparatus.

Note that the method of storing the computer programs and data in the RAM 1308 is not limited to a specific method, and, for example, the computer programs and data received from an external apparatus via the communication unit 1303 may be stored in the RAM 1308 after being temporarily stored in the data storage unit 1302. Also, the computer programs and data received from an external apparatus via the communication unit 1303 may be directly stored in the RAM 1308.

The CPU 1306 can execute various processing associated with the input image using the result of calculation processing executed on the input image stored in the RAM 1308 or the data storage unit 1302 by the CNN processing unit 1305. The various processing associated with the input image includes, for example, face detection from the input image, facial recognition using the input image, counting the number of faces in the input image, and the like. The CPU 1306 stores the results of various processing including the various processing associated with the input image in the RAM 1308 or the data storage unit 1302.

Figure 13:
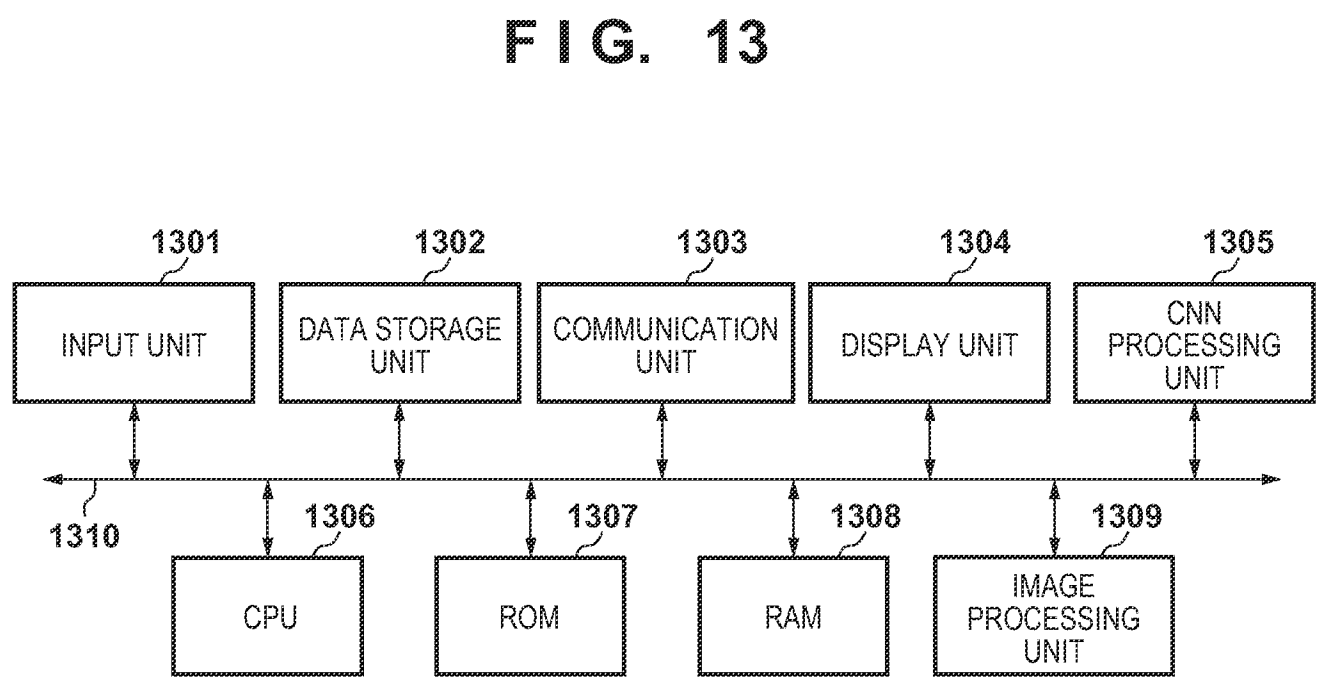

Note that in FIG. 13, there is one CPU 1306, however there may be two or more.

Setting data of the image processing apparatus, computer programs and data associated with activating the image processing apparatus, computer programs and data associated with basic operations of the image processing apparatus, and the like are stored in the ROM 1307.

The RAM 1308 includes an area for storing computer programs and data loaded from the data storage unit 1302 or the ROM 1307 and an area for storing the calculation processing result output from the CNN processing unit 1305. Also, the RAM 1308 includes an area for storing computer programs and data received from an external apparatus via the communication unit 1303 and a working area used when the CPU 1306 or an image processing unit 1309 executes one of the various items of processing. The RAM 1308 of such a configuration can provide various areas as appropriate.

When the image processing unit 1309 receives an image processing instruction from the CPU 1306, the image processing unit 1309 executes image processing such as range adjustment of the pixel values of the pixels in the image on the image stored in the RAM 1308 or the data storage unit 1302.

The input unit 1301, the data storage unit 1302, the communication unit 1303, the display unit 1304, CNN processing unit 1305, the CPU 1306, the ROM 1307, the RAM 1308, and the image processing unit 1309 are all connected to a system bus 1310.

Next, a configuration example of the CNN will be described using FIG. 2. The CNN illustrated in FIG. 2 includes four layers (layer 1, layer 2, layer 3, and layer 4). The layer 1 includes four feature images (feature image (1,1), (1,2), (1,3), (1,4)), and the layer 2 includes four feature images (feature image (2,1), (2,2), (2,3), (2,4)). The layer 3 includes four feature images (feature image (3,1), (3,2), (3,3), (3,4)), and the layer 4 includes four feature images (feature image (4,1), (4,2), (4,3), (4,4)).

In the layer 1, the multiply-accumulate operation of Formula 2 is performed using a coefficient filter for the feature images (1,1), (1,2), (1,3), (1,4), generating the feature images (2,1), (2,2), (2,3), (2,4) of the layer 2 as output feature images.

In the layer 2, the multiply-accumulate operation of Formula 2 is performed using a coefficient filter for the feature images (2,1), (2,2), (2,3), (2,4), generating the feature images (3,1), (3,2), (3,3), (3,4) of the layer 3 as output feature images.

In the layer 3, the multiply-accumulate operation of Formula 2 is performed using a coefficient filter for the feature images (3,1), (3,2), (3,3), (3,4), generating the feature images (4,1), (4,2), (4,3), (4,4) of the layer 4 as output feature images.

Also, a dilated convolution processing dilation rate R of the layer 1 is set to 1, the dilated convolution processing dilation rate R of the layer 2 is set to 2, and the dilated convolution processing dilation rate R of the layer 3 is set to 4. The size of the coefficient filter prior to dilation is 3×3, and in each layer, a multiply-accumulate operation is performed with the feature image using the post-dilation coefficient filter obtained by dilation of the pre-dilation coefficient filter according to a dilated convolution processing dilation rate corresponding to the layer.

An example of dilation using a coefficient filter for each layer is illustrated on the left side of FIG. 17. In the layer 1, as illustrated in frame 1701, the multiply-accumulate operation of Formula 2 is performed with the feature image using a post-dilation coefficient filter (coefficient filter C'x, y on the right side) obtained by dilation of the pre-dilation coefficient filter (coefficient filter Cx, y on the left side) according to the dilated convolution processing dilation rate R of 1. In a case where R is 1, the size does not change from the pre-dilation coefficient filter to the post-dilation coefficient filter.

In the layer 2, as illustrated in frame 1702, the multiply-accumulate operation of Formula 2 is performed with the feature image using a post-dilation coefficient filter (coefficient filter C'x, y on the right side) obtained by dilation of the pre-dilation coefficient filter (coefficient filter Cx, y on the left side) according to the dilated convolution processing dilation rate R of 2. The post-dilation coefficient filter is a 5×5 coefficient filter obtained by inserting a single inactive coefficient (for example, a coefficient of 0) between the coefficients of the pre-dilation coefficient filter.

In the layer 3, as illustrated in frame 1703, the multiply-accumulate operation of Formula 2 is performed with the feature image using a post-dilation coefficient filter (coefficient filter C'x, y on the right side) obtained by dilation of the pre-dilation coefficient filter (coefficient filter Cx, y on the left side) according to the dilated convolution processing dilation rate R of 4. The post-dilation coefficient filter is a 9×9 coefficient filter obtained by inserting three inactive coefficients between the coefficients of the pre-dilation coefficient filter. In this manner, the dilated convolution processing dilation rate R is different for each layer in the CNN.

FIG. 12 is a diagram illustrating an example of the CNN and convolution processing. Feature data is extracted from the same position of four feature images 1201 in the layer 1, and a result of the multiply-accumulate operation using the coefficient filter is calculated. The result corresponds to feature data of the same position in the next layer, the layer 2, and a feature image 1202 including the feature data is obtained.

FIG. 4 is a block diagram illustrating a configuration example of the CNN processing unit 1305 described above. The functional units illustrated in FIG. 4 may be implemented via hardware or implemented via software (a computer program). In the case of the latter, the computer program is stored in the data storage unit 1302. The operations of the CNN processing unit 1305 will now be described according to the flowchart of FIG. 1.

In step S101, a control unit 401 reads out information (structural information) relating to the pre-dilation coefficient filter, the input feature image (the feature image of the layer 1 in the example of FIG. 2), and the structure of the CNN from the data storage unit 1302 or the RAM 1308 and stores this in a data holding unit 408. The structural information includes, for example, the multiply-accumulate operation calculation amount, the number of layers, the size of the feature image, the number of feature images in each layer, and the like.

Also, under control by the control unit 401, the processing of steps S103 to S111 is executed for each layer in the CNN. In the example of FIG. 2, first, the layer 1 is set as the target layer, and the processing of steps S103 to S111 is executed on the layer 1. Next, the layer 2 is set as the target layer, and the processing of steps S103 to S111 is executed on the layer 2. Then, the layer 3 is set as the target layer, and the processing of steps S103 to Sill is executed on the layer 3.

In step S103, a read out unit 405, under control by the control unit 401, obtained the dilated convolution processing dilation rate R corresponding to the target layer from the data holding unit 408. The read out unit 405 obtains 1 as the dilated convolution processing dilation rate R in a case where the target layer is the layer 1, obtains 2 as the dilated convolution processing dilation rate R in a case where the target layer is the layer 2, and obtains 4 as the dilated convolution processing dilation rate R in a case where the target layer is the layer 3.

In this manner, the dilated convolution processing dilation rate R can be set for each layer. Note that the dilated convolution processing dilation rate is not limited to being set for each layer and may be for each output feature image or set for each group of output feature images, for example.

Also, under control by the control unit 401, the processing of steps S105 to S111 is executed for each output feature image (feature image of the next layer (next layer to be set as the target layer) subsequent to the target layer) generated at the target layer. In the example of FIG. 2, in a case where the target layer is the layer 1, first, the processing of steps S105 to S111 to generate a feature image (2,1) is executed, and, next, the processing of steps S105 to S111 to generate a feature image (2,2) is executed. In a similar manner, next, the processing of steps S105 to S111 to generate a feature image (2,3) is executed, and, next, the processing of steps S105 to S111 to generate a feature image (2,4) is executed. In step S105, the control unit 401 initializes to 0 the convolution operation processing result held in a storage unit 503 (FIG. 5) of a processing unit 406.

Also, under control by the control unit 401, the processing of steps S107 and S108 is executed for each feature image in the target layer. In the example of FIG. 2, in a case where the target layer is the layer 1, first, the feature image (1,1) is set to the target feature image, and the processing of steps S107 and S108 is executed for the target feature image. Next, the feature image (1,2) is set to the target feature image, and the processing of steps S107 and S108 is executed for the target feature image. Then, the feature image (1,3) is set to the target feature image, and the processing of steps S107 and S108 is executed for the target feature image. Next, the feature image (1,4) is set to the target feature image, and the processing of steps S107 and S108 is executed for the target feature image.

In step S107, in a case where the target layer is the layer 1, the control unit 401 transfers the input feature image stored in the data holding unit 408 to a holding unit 402 as the target feature image and transfers the pre-dilation coefficient filter stored in the data holding unit 408 to a holding unit 404. In a case where the target layer is a layer A (A being an integer of 2 or greater), for the layer A, the feature image generated by a processing unit 407 is transferred and stored in the holding unit 402 as the target feature image. Because the pre-dilation coefficient filter has already been transferred to the holding unit 404, step S107 may be omitted.

In step S108, under control by the control unit 401, the processing unit 406 executes convolution operation processing using the target feature image held in the holding unit 402, the dilated convolution processing dilation rate R read out by the read out unit 405, and the coefficient filter held in the holding unit 404. The processing in step S108 will be described in detail below using FIG. 15.

At the point in time when the processing has advanced to step S110, convolution operation processing has been executed for all of the feature images in the processing target layer and the results (convolution operation processing results) of the convolution operation processing has been stored in the storage unit 503 (FIG. 5). However, in step S110, under control by the control unit 401, the processing unit 407 executes activation processing by executing calculation processing based on Formula 5 below on the basis of each of the convolution operation processing results stored in the storage unit 503.

$$f(x) = \begin{cases} 0, & x < 0 \\ x, & x \geq 0 \end{cases} \qquad \text{(Formula 5)}$$

Herein, f(x) is an activation function, and x is a convolution operation processing result. Also, in this example, the activation function is implemented using a rectified linear unit (ReLU). However, the activation function is not limited to the ReLU and may be implemented using another nonlinear function or a quantization function. Then, in accordance with the information of the layer, the processing unit 407 executes pooling processing on the basis of the activation processing result and adjusts the size of the output feature image as necessary.

In step S111, the control unit 401 stores the result (output feature image) of the activation and pooling processing obtained in step S110 in the holding unit 402 as the feature image of the next layer (next layer to be set as the target layer) subsequent to the target layer.

Next, the processing in step S108 described above will be described in detail with reference to the flowchart of FIG. 15. FIG. 3 is a block diagram illustrating a configuration example of the processing unit 406. In this example, the holding unit 402 is configured to readably store the target feature image in units of pixel blocks (pixel sets) with a size of 6 pixels×6 pixels. For example, the control unit 401 divides the target feature image into a plurality of pixel sets (with there being an overlapping portion between adjacent pixel sets) and stores each pixel set in the holding unit 402. In this example, as illustrated in FIG. 14A, the pixel (feature data) at position (i,j) (1≤i,j≤6) in a pixel set 1401 is represented by $D_{i,j}$.

Also, in this example, the holding unit 404 is configured to store a coefficient filter with a 3×3 size. In this example, as illustrated in FIG. 14B, the coefficient at (i,j) (1≤i,j≤3) in the coefficient filter is represented by $C_{i,j}$, which is equivalent to Cx,y, (0≤x,y≤2) in Formula 1, 2.

In the present embodiment, there are four calculation devices, and the pixel values of different pixels are multiplied in parallel using a common coefficient and, as illustrated in FIG. 14C, four convolution processing results $(O_{1,1}, O_{1,2}, O_{2,1}, O_{2,2})$ of different positions are calculated in parallel.

In this example, the processing of steps S1503 to S1512 is executed for each pixel set in the target feature image. In step S1503, a control unit 311 sets, in setting unit 301, a function (Formula 8) defining a pixel transfer pattern, a function (Formula 9) defining a coefficient transfer pattern, a function (Formula 10) defining the interval of the pixel to be transferred, and a function (Formula 11) defining the interval of the coefficient to be transferred. Formulas 8 to 11 will be described below.

In step S1504, the control unit 311 selects, as a selected pixel set, a single pixel set from among unselected pixel sets in the target feature image stored in the holding unit 402, reads out the selected pixel set from the holding unit 402, and stores the selected pixel set in a storage unit 306. Also, the control unit 311 selects, as a selected coefficient filter, a corresponding coefficient filter from among the coefficient filters held in the holding unit 404, reads of the selected coefficient filter from the holding unit 404, and stores the selected coefficient filter in a storage unit 305.

In step S1505, the control unit 311 initializes the processing unit 406 by setting an initial value for the result of convolution processing and initializing to 1 a variable m (the variable m used from the present embodiment onward is different to the variable m used prior to Formula 4) representing a processing order for the coefficient. The initial value of the result of the convolution processing is related to the input feature image, and in the case of processing the first input feature image, the initial value of the result of the convolution processing is set to 0 and in the case of processing a feature image after the first one, the initial value of the result of the convolution processing corresponds to the processing result of the previous feature image.

In step S1506, a coefficient filter kernel is scanned and convolution processing (dilated convolution processing) is performed via a multiply-accumulate operation using the selected pixel set and the selected coefficient filter. In the present embodiment, the convolution processing result is obtained by calculating Formula 6 and Formula 7 below.

$$O_{i,j} = \sum_{m=1}^{X \times Y} P_{i,j,m} \qquad \text{(Formula 6)}$$

$$P_{i,j,m} = D_{Dx(m),Dy(m)} \times C_{Cx(m),Cy(m)} \qquad \text{(Formula 7)}$$

Herein, i is an index representing the position in the horizontal direction, and j is an index representing the position in the vertical direction. Dx(m) is a function that returns the horizontal position corresponding to the variable m in the pixel set, and Dy(m) is a function that returns the vertical position corresponding the variable m in the pixel set. Cx(m) is a function that returns the horizontal position corresponding to the variable m in the selected coefficient filter, and Cy(m) is a function that returns the vertical position corresponding the variable m in the selected coefficient filter. The processing in step S1506 will be described in detail below.

In step S1512, a processing unit 309 stores, in a memory 310, four convolution processing results $(O_{1,1}, O_{1,2}, O_{2,1}, O_{2,2})$ obtained via a multiply-accumulate operation performed by the processing unit 309 in step S1506. The processing unit 407 executes activation processing and pooling processing using the convolution processing results stored in the memory 310.

Next, the processing in step S1506 described above will be described in detail. In step S1506, the processing of steps S1508 to S1510 is repeated a number of times corresponding to the number of coefficients in the selected coefficient filter.

In step S1508, a transfer control unit 307 transfers the function of Formula 8 and the function of Formula 10 set by the setting unit 301 to the storage unit 306. Also, the transfer control unit 307 obtains a pixel $D_{Dx(m),Dy(m)}$ at a position (Dx(m),Dy(m)) in the selected pixel set using the functions transferred to the storage unit 306. A transfer control unit 304 transfers the function of Formula 9 and the function of Formula 11 set by the setting unit 301 to the storage unit 305. Also, the transfer control unit 304 obtains a coefficient $C_{Cx(m),Cy(m)}$ at a position (Cx(m),Cy(m)) in the selected coefficient filter using the functions transferred to the storage unit 305.

An example configuration of the storage unit 306 will now be described using FIG. 6. The storage unit 306 includes a plurality of pixel storage units. There are two types (pixel storage unit A and pixel storage unit B) of the pixel storage units, with each type being connected to the surrounding pixel storage units and disposed in two-dimensional arrangement. The pixel storage unit A is connected to the processing unit 309, and the pixel storage unit B is not connected to the processing unit 309. The pixel storage unit A and the pixel storage unit B each include a pixel storage memory for storing pixels and a multiplexer.

Figure 6:
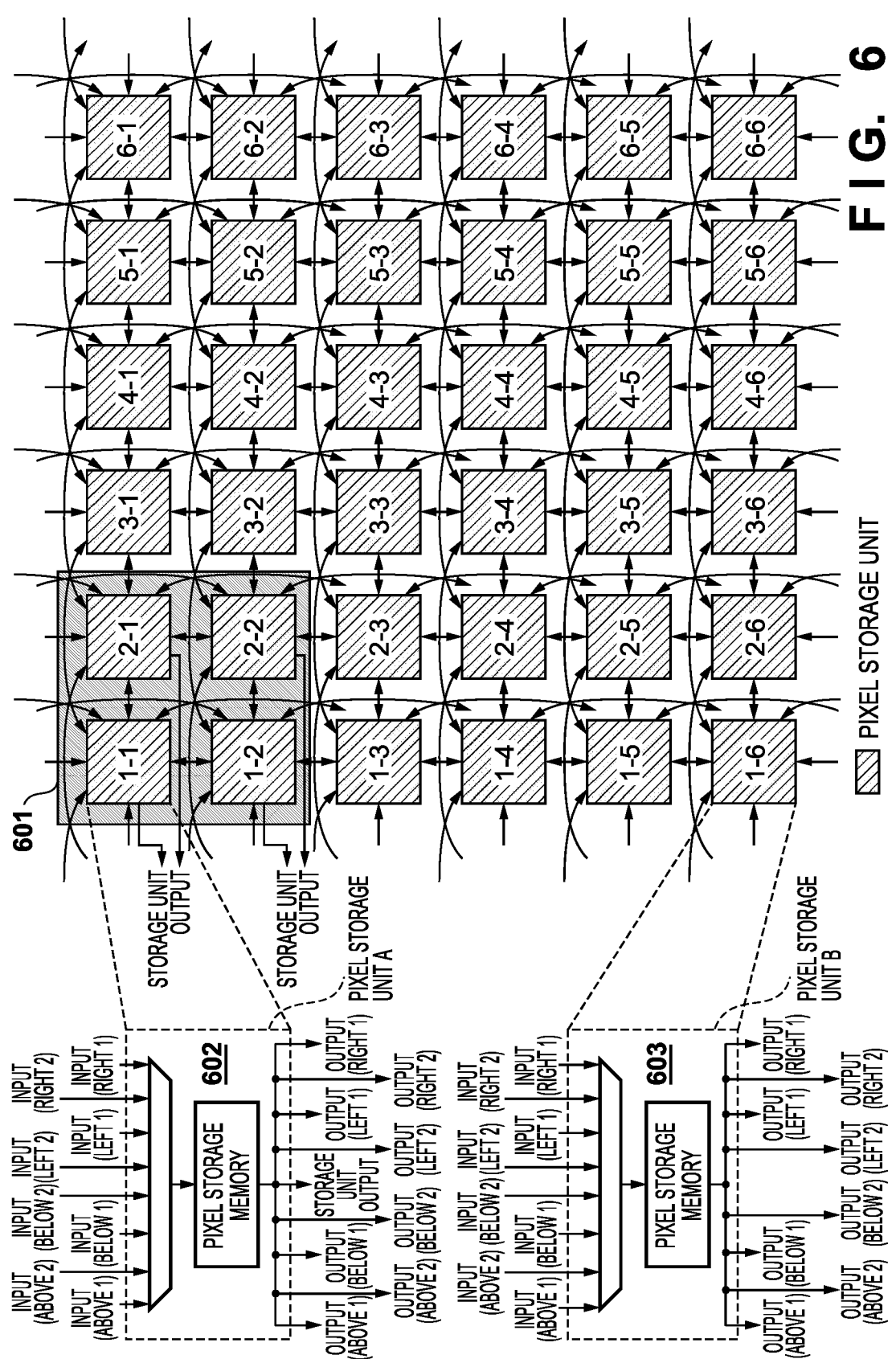
FIG. 6 is a diagram illustrating an example configuration of a storage unit 306.

In FIG. 6, storage unit 306 includes 36 pixel storage units and can support processing in which the dilated convolution processing dilation rate R is 1 or 2. The configuration of the pixel storage units B other than the pixel storage units A in a block 601 is illustrated within a dashed line 603. A single pixel storage unit B can store a single pixel. The pixel storage unit B selects the pixels held in the eight pixel storage units surrounding itself (one above, one below, one to the left, one to the right, two above, two below, two to the left, and two to the right) on the basis of the function of Formula 8 and the function of Formula 10 held in the setting unit 301 and stores these in its own pixel storage unit. Also, a single pixel storage unit B can supply a pixel to the eight surrounding pixel storage units in parallel. There are four parallel calculation devices, and, because the four pixels to be processed in parallel are different, there are four pixel storage units A (pixel storage units 1-1, 1-2, 2-1, 2-2) within the block 601. The configuration of the pixel storage unit A is illustrated within a dashed line 602. The pixel storage unit A and the pixel storage unit B have the same configuration, and a single pixel storage unit A can store a single pixel. The pixel storage unit A selects the pixels held in the eight pixel storage units surrounding itself (one above, one below, one to the left, one to the right, two above, two below, two to the left, and two to the right) on the basis of the function of Formula 8 and the function of Formula 10 held in the setting unit 301 and stores these in its own pixel storage memory. Also, a single pixel storage unit can supply a pixel to the eight surrounding pixel storage units in parallel and the output destination of the storage unit 306. In a case where the dilated convolution processing dilation rate R is 1, "surrounding itself" means one above, one down, one to the left, and one to the right are selected, and in a case where the dilated convolution processing dilation rate R is 2, "surrounding itself" means two above, two below, two to the left, and two to the right are selected.

An example configuration of the storage unit 305 will now be described using FIG. 7. The storage unit 305 includes a plurality of coefficient storage units. There are two types (coefficient storage unit A and coefficient storage unit B) of the coefficient storage units, with each type being connected to the surrounding coefficient storage units and disposed in two-dimensional arrangement. The coefficient storage unit A is connected to the processing unit 309, and the coefficient storage unit B is not connected to the processing unit 309. The coefficient storage unit A and the coefficient storage unit B each include a coefficient storage memory for storing coefficients and a multiplexer.

Figure 7:
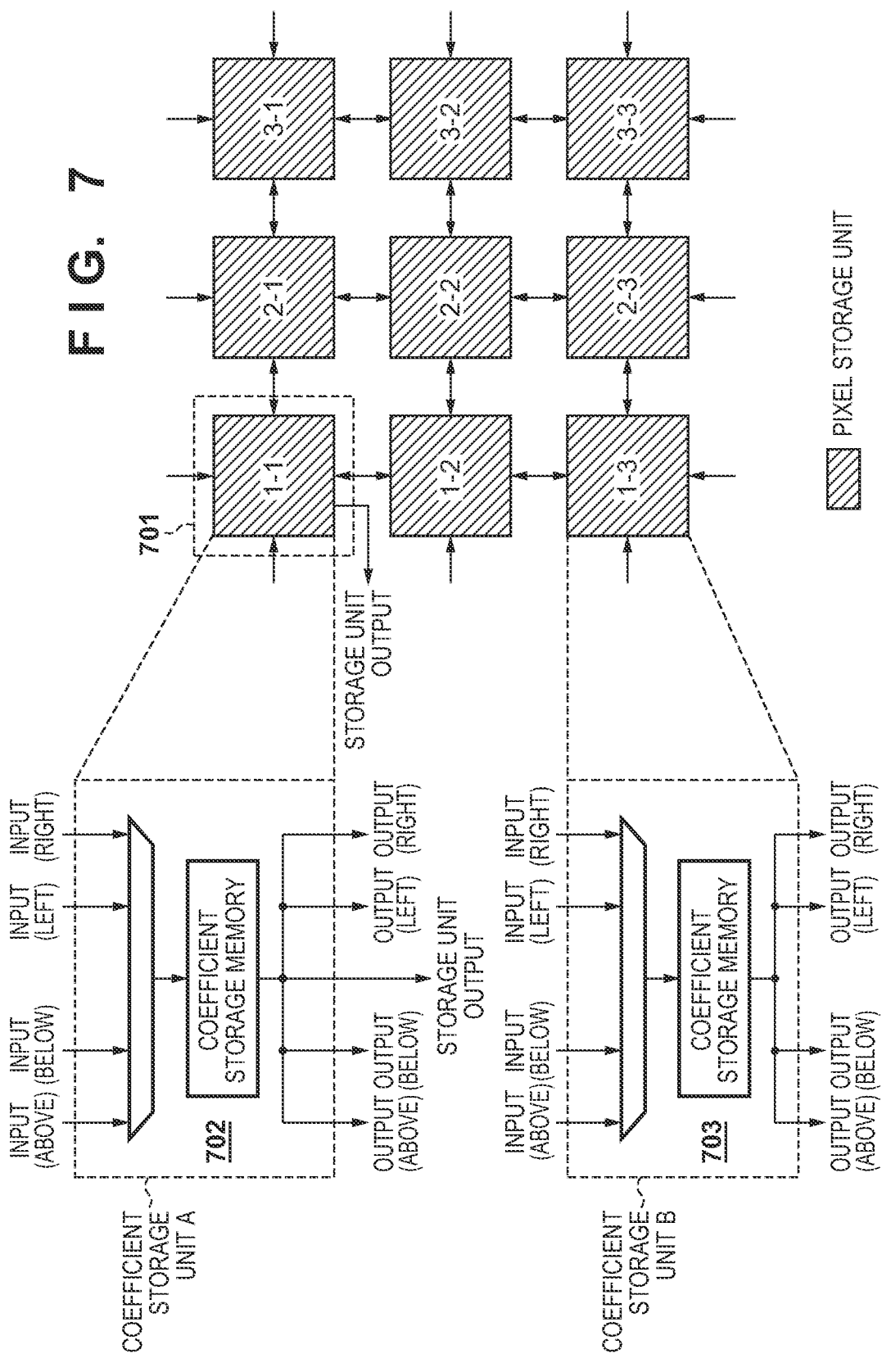
FIG. 7 is a diagram illustrating an example configuration of a storage unit 305.

In FIG. 7, the storage unit 305 includes nine coefficient storage units, with the configuration of the coefficient storage units B other than the coefficient storage unit A within a dashed line 701 being illustrated within a dashed line 703. A single coefficient storage unit B can store a single coefficient. The coefficient storage unit B selects the coefficient held in the four coefficient storage units surrounding itself (one above, one below, one to the left, one to the right) on the basis of the function of Formula 9 and the function of Formula 11 set by the setting unit 301 and stores these in its own coefficient storage memory. Also, a single coefficient storage unit B can supply a coefficient to the four surrounding coefficient storage units in parallel. There are four parallel calculation devices, and, because the coefficients to be processed in parallel are the same, there is a single coefficient storage unit A (coefficient storage unit 1-1) within the dashed line 701. The configuration of the coefficient storage unit A is illustrated within a dashed line 702. The coefficient storage unit A and the coefficient storage unit B have the same configuration, and a single coefficient storage unit A can store a single coefficient. The coefficient storage unit A selects the coefficient held in the four coefficient storage units surrounding itself (one above, one below, one to the left, one to the right) on the basis of the function of Formula 9 and the function of Formula 11 held in the setting unit 301 and stores these in its own coefficient storage memory. Also, a single coefficient storage unit can supply a coefficient to the four surrounding coefficient storage units in parallel and the output destination of the storage unit 305. Formulas 8 to 11 are as follows.

$$(Dx(m), Dy(m)) = \qquad\qquad\qquad \text{(Formula 8)}$$
$$(Dx(m-1) + Ix(P_D(m)), Dy(m-1) + Iy(P_D(m)))$$

$$(Cx(m), Cy(m)) = \qquad\qquad\qquad \text{(Formula 9)}$$
$$(Cx(m-1) + Jx(P_C(m)), Cy(m-1) + Jy(P_C(m)))$$

$$(Ix(n), Iy(n)) = \begin{cases} (R, 0), & \text{In the case of } n = 0 \\ (0, R), & \text{In the case of } n = 1 \\ (-R, 0), & \text{In the case of } n = 2 \\ (0, -R), & \text{In the case of } n = 3 \end{cases} \quad \text{(Formula 10)}$$

$$(Jx(n), Jy(n)) = \begin{cases} (1, 0), & \text{In the case of } n = 0 \\ (0, 1), & \text{In the case of } n = 1 \\ (-1, 0), & \text{In the case of } n = 2 \\ (0, -1), & \text{In the case of } n = 3 \end{cases} \quad \text{(Formula 11)}$$

Dx(1), Dy(1), Cx(1), Cy(1) are each set with an initial value. In a case where the value of the variable m is 1, Dx(1), Dy(1), Cx(1), and Cy(1) are used for Dx(m), Dy(m), Cx(m), and Cy(m), respectively. In a case where the value of the variable m is 2, Dx(m), Dy(m), Cx(m), Cy(m) are obtained in accordance with Formulas 8 to 11. Ix( ) and Jx( ) are shift functions with respect to the horizontal direction, and Iy( ) and Jy( ) are shift functions with respect to the vertical direction. $P_D(\ )$ and $P_C(\ )$ will be described below.

In step S1509, the transfer control unit 307 transfers the four pixels (in the present embodiment, there are four parallel calculation devices and thus four pixels obtained in parallel and transferred) obtained in step S1508 to the processing unit 309. Also, the transfer control unit 304 transfers the single coefficient obtained in step S1508 to the processing unit 309.

An example configuration of the processing unit 309 will now be described using the block diagram of FIG. 5. As illustrated in FIG. 5, the processing unit 309 includes (M×N) individual sets including a multiplier 501, an adder 502, and the storage unit 503, allowing multiply-accumulate operations using (M×N) number of pixels and a single coefficient to be processed in parallel. In the present embodiment, there are four calculation devices and (M×N) is four. In a case where the variable m is 1 due to the initial value of the processing result being set in step S1505, this initial value is stored in the storage unit 503.

In step S1510, the processing unit 309 performs multiplications and cumulative arithmetic operations of the multiplication results using the multipliers 501 and the adders 502 to perform the multiply-accumulate operations (convolution processing) of Formula 6 and Formula 7 described above. Also, the processing unit 309 stores the result of the convolution processing in the storage unit 503. In the present embodiment, there are four parallel calculation devices. Thus, the products ($P_{i,j,m}$, i=1,2, j=1,2) of the pixels and the coefficients indicated in Formula 6 can be calculated in parallel, and the calculated products can be added to the processing results ($O_{i,j}$, i=1,2, j=1,2).

Also, in a case where, at the time the step S1510 ends, the value of the variable m has not reached the number (X×Y=9) of coefficients in the coefficient filter, the control unit 311 advances the value of the variable m one increment and repeats the processing of steps S1508 to S1510. On the other hand, in a case where, at the time the step S1510 ends, the value of the variable m has reached the number (X×Y=9) of coefficients in the coefficient filter, the process proceeds to step S1512.

Processing Example of Dilated Convolution Processing

Herein, a processing example of the multiply-accumulate operation (step S1506) of a single pixel set and a single coefficient filter will be described. Before the multiply-accumulate operation is started, because the processing unit 406 has been initialized in step S1505, the convolution processing results $O_{1,1}$ to $O_{2,2}$ correspond to the initial value. The value of the variable m is set to 1, and then the process proceeds to step S1508.

Regarding $P_D(m)$ in Formula 8 and $P_C(m)$ in Formula 9, in a case where the value of the variable m is 1, $P_C(m)$, $P_D(m)$, Ix( ), and Iy( ) are not calculated, and (Dx(1), Dy(1))=(Cx(1), Cy(1))=(1,1) is set to.

Figure 8A:
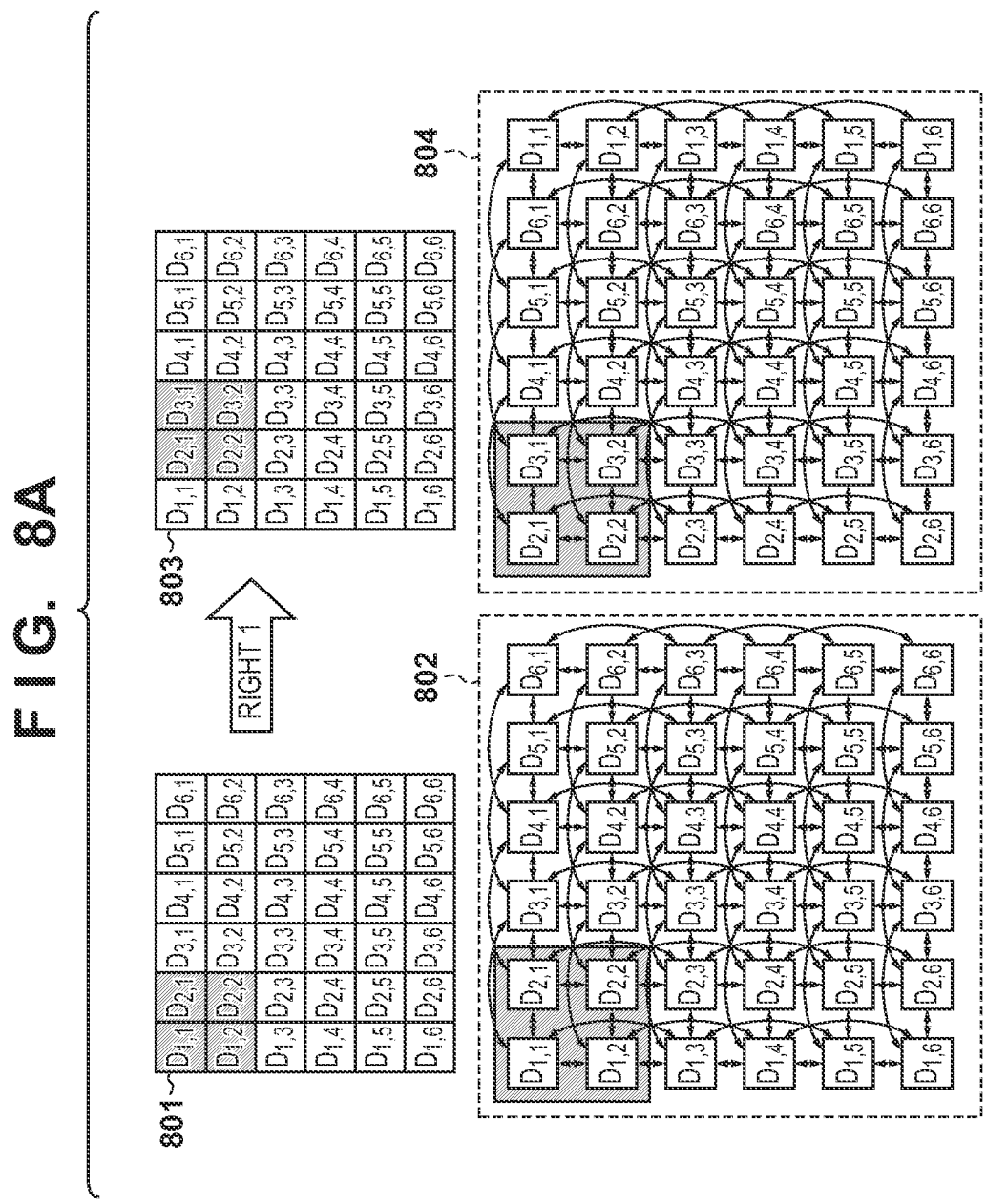
FIG. 8A is a diagram illustrating the corresponding relationship between pixels and positions.
Figure 8B:
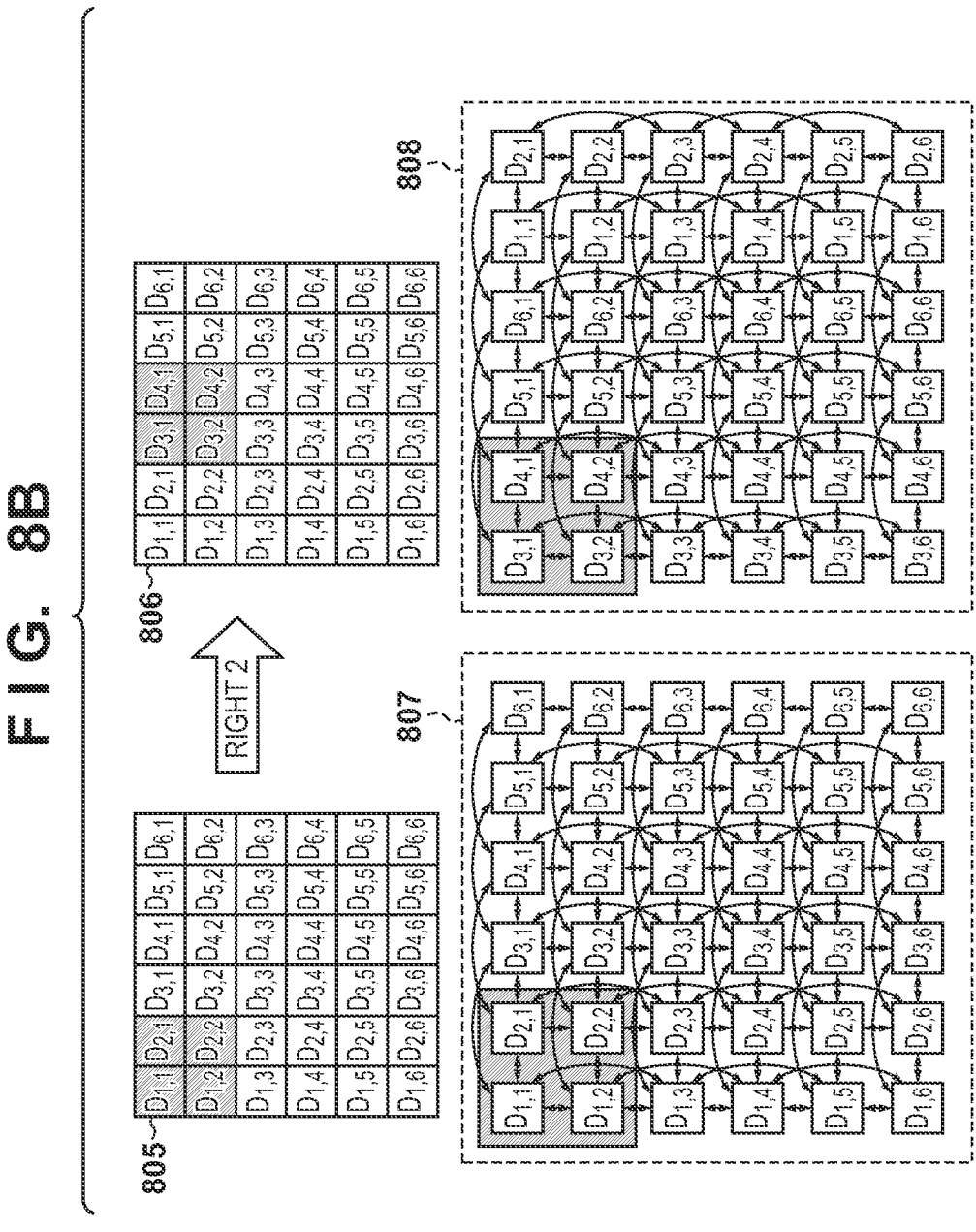
FIG. 8B is a diagram illustrating the corresponding relationship between pixels and positions.

In step S1508, the transfer control unit 307 obtains the pixel $D_{1,1}$ and the coefficient $C_{1,1}$. As illustrated in FIGS. 8A and 8B, in a case where the value of the variable m is 1, four of the pixels ($D_{1,1}$ to $D_{2,2}$) in a pixel set 801 are obtained. A dashed line 802 indicates an example of a pixel stored in the storage unit 306 illustrated in FIG. 6, and the 36 pixel storage units store 36 pixels ($D_{1,1}$ to $D_{6,6}$).

As illustrated in FIG. 9, in a case where the value of the variable m is 1, a single coefficient ($C_{1,1}$) is obtained from a coefficient filter 901. A dashed line 902 indicates an example of a coefficient stored in the storage unit 305 illustrated in FIG. 6, and the nine coefficient storage units store nine coefficients ($C_{1,1}$ to $C_{3,3}$).

Figure 10:
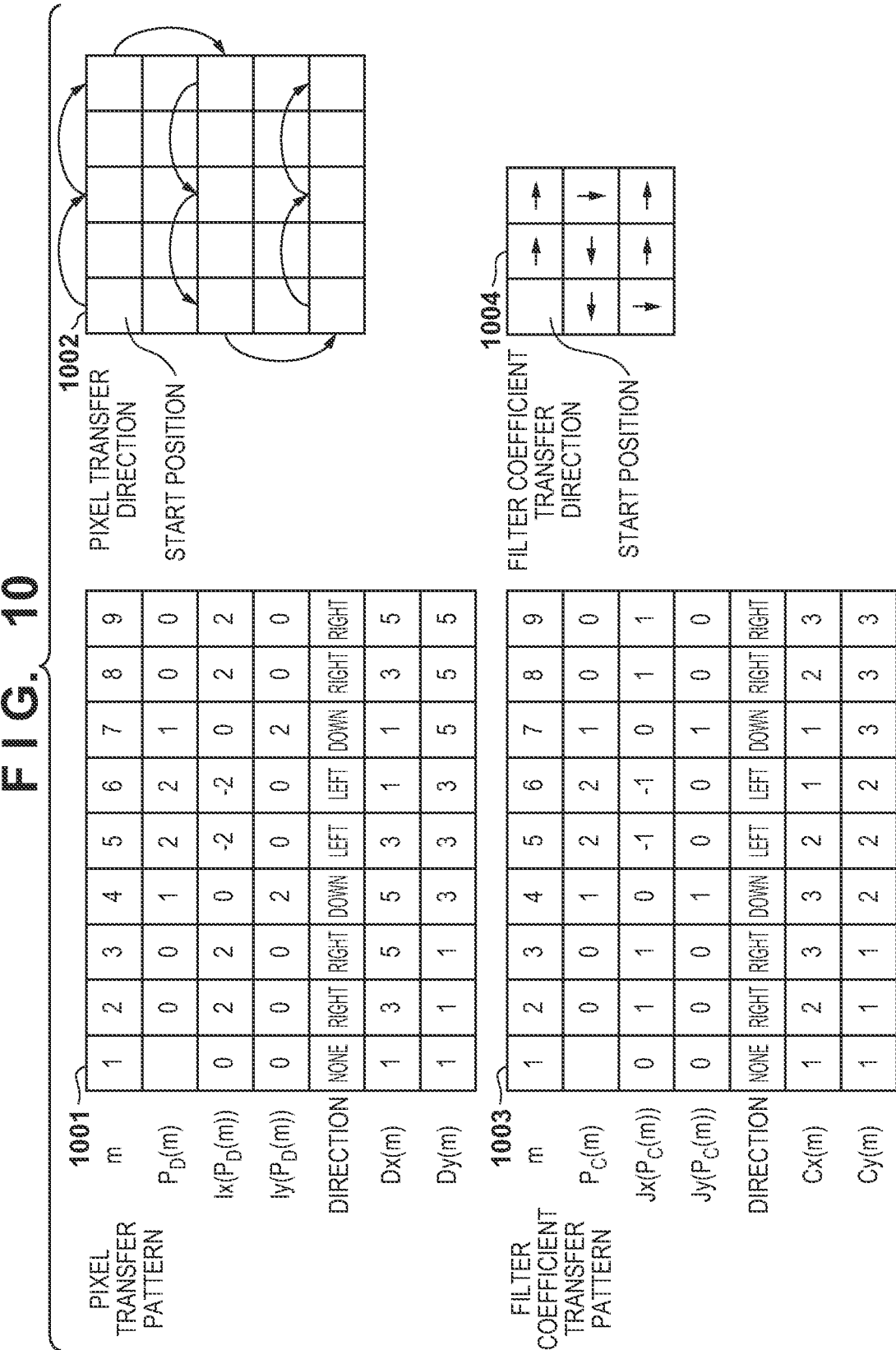
FIG. 10 is a diagram illustrating pixel transfer patterns and directions thereof and coefficient transfer patterns and directions thereof.

Examples of the pixel transfer pattern (m, $P_D(m)$, Ix($P_D$(m)), Iy($P_D$(m)) and direction, Dx(m), Dy(m)), the coefficient transfer pattern (m, $P_C(m)$, Jx($P_C$(m)), Jy($P_C$(m)) and direction, Cx(m), Cy(m)) and the direction will be described using FIG. 10. As illustrated in FIG. 6, there are four pixel storage units linked to output. However, here only the upper left pixel storage unit 1-1 will be described. The pixel storage unit 1-1 corresponds to the output result ($O_{1,1}$), and the start position of the pixel transfer is the upper left. As illustrated in FIG. 7, the coefficient storage unit linked to output is the coefficient storage unit 1-1. The start position of the coefficient transfer is the upper left.

Figure 11A:
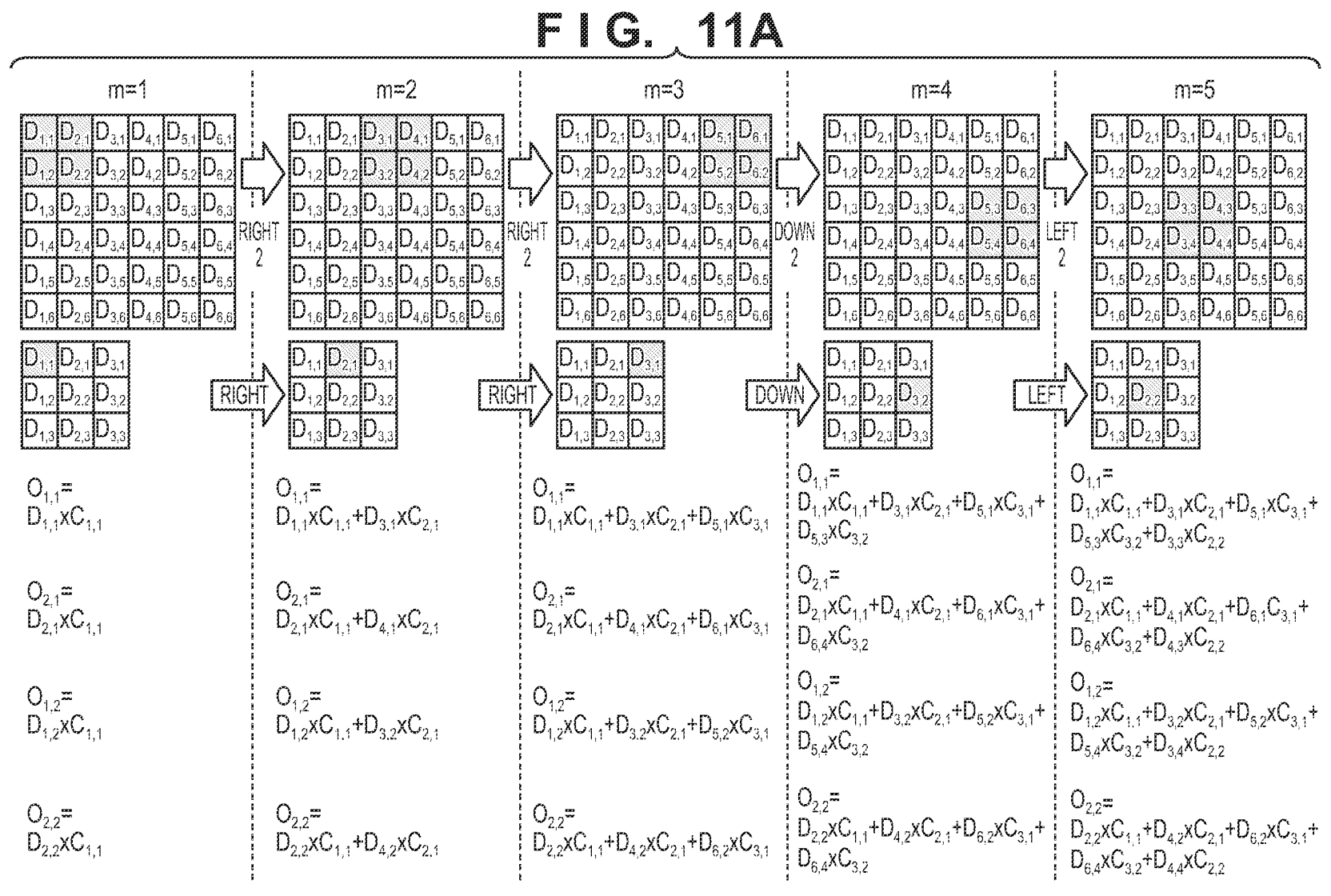

An example (in which the convolution processing dilation rate R is 2) of pixel transfer and coefficient transfer will be described using FIGS. 11A and 11B. In a case where the value of the variable m is 1, the product of $D_{1,1}$ and $C_{1,1}$ is added to the initial value, and $O_{1,1}$ is calculated using Formula 6. $O_{1,2}$, $O_{2,1}$, and $O_{2,2}$ illustrated in FIGS. 11A and 11B can be obtained by a method similar to the method for obtaining $O_{1,1}$, and thus the description thereof is omitted. In the present embodiment, four convolution processing results can be calculated in parallel. Then, the value of the variable m is changed to 2, and the process proceeds to step S1508.

In a case where the value of the variable m is 2 or greater, $P_D(2)$ is 0, and Ix($P_D(2)$) and Iy($P_D(2)$) is (2,0). Also, (Dx(2), Dy(2)) is obtained as (3,1) from Formula 8 and Formula 10 described above. As illustrated in FIG. 6, there are eight types of shift function values, and an input pixel can be directly selected with the configuration in the dashed line 602 or the dashed line 603. Thus, the processing speed is fast.

$P_C(2)$ is 0, and Ix($P_C(2)$) and Iy($P_C(2)$) are (1,0). Also, (Cx(2), Cy(2)) is obtained as (2,1) from Formula 9 and Formula 11 described above. As illustrated in FIG. 7, there are four types of shift function values, and coefficient can be directly selected with the configuration in the dashed line 702 or the dashed line 703. Thus, the processing speed is fast.

In step S1508, the transfer control unit 307 obtains the pixel $D_{3,1}$ from the selected pixel set. The transfer control unit 304 obtains the coefficient $C_{2,1}$ from the coefficient filter. As illustrated in FIGS. 8A and 8B, in a case where the value of the variable m is 2, four of the pixels ($D_{2,1}$ to $D_{3,2}$) in a pixel set 803 are obtained as output pixels. The value of the shift function is different depending on the dilated convolution processing dilation rate R.

The dashed line 802 indicates the pixel held by the storage unit 306 of FIG. 6 in a case where the dilated convolution processing dilation rate R is 1. Because the shift direction of the output pixel is to the right, the pixel storage unit 1-1 in the storage unit 306 selects a pixel from the pixel storage unit 2-1 and holds it in the pixel storage memory of FIG. 6. The pixel in the pixel storage unit 1-1 is replaced with the pixel in the pixel storage unit 2-1, and the state indicated by the dashed line 802 is changed to the state indicated by a dashed line 804.

A dashed line 808 indicates the pixel held by the storage unit 306 of FIG. 6 in a case where the dilated convolution processing dilation rate R is 2. As illustrated by 805 and 806, because the shift direction of the output pixel is to the right, the pixel storage unit 1-1 in the storage unit 306 selects a pixel from the pixel storage unit 3-1 and holds it in the pixel storage memory of FIG. 6. The pixel in the pixel storage unit 1-1 is replaced with the pixel in the pixel storage unit 3-1, and the state indicated by a dashed line 807 is changed to the state indicated by the dashed line 808.

In this manner, according to the present embodiment, data (data separated from the read out data in the row direction by two or more) other than the data adjacent to the read out data can be read out next. In other words, a non-adjacent pixel can be obtained from the feature image.

As illustrated in FIG. 9, in a case where the value of the variable m is 2, a single coefficient ($C_{2,1}$) is obtained from a coefficient filter 903 as an output coefficient. The processing using the shift function is not related to the dilated convolution processing dilation rate R.

The dashed line 902 (corresponding to 901) indicates the coefficient held by the storage unit 305 illustrated in FIG. 7. Because the shift direction of the output coefficient is to the right, the coefficient storage unit 1-1 in the storage unit 305 selects a coefficient from the coefficient storage unit 2-1 and holds it in the coefficient storage memory of FIGS. 8A and 8B. The coefficient in the coefficient storage unit 1-1 is replaced with the coefficient in the coefficient storage unit 2-1, and the state indicated by the dashed line 902 is changed to the state indicated by a dashed line 904.

Examples of the coefficient transfer pattern (m, $P_D(m)$, Ix($P_D$(m)), Iy($P_D$(m)) and direction, Dx(m), Dy(m)), the coefficient transfer pattern (m, $P_C$(m), $Jx(P_C$(m)), $Jy(P_C$(m))) and direction, $Cx$(m), $Cy$(m)) and the direction will be described using FIG. 10. As illustrated in FIG. 10, the storage unit 1-1 corresponds to the output result ($O_{1,1}$), and the pixel shift direction is to the right. Also, the coefficient shift direction is to the right.

An example (in which the convolution processing dilation rate R is 2) of pixel transfer and coefficient transfer will be described using FIGS. 11A and 11B. In a case where the value of the variable m is 2, the product of $D_{3,1}$ and $C_{2,1}$ is added to the product of $D_{1,1}$ and $C_{1,1}$ calculated before, and $O_{1,1}$ is calculated using Formula 6. $O_{1,2}$, $O_{2,1}$, and $O_{2,2}$ illustrated in FIGS. 11A and 11B can be obtained by a method similar to the method for obtaining $O_{1,1}$, and thus the description thereof is omitted.

Then, the value of the variable m is changed to 3, and the process proceeds to step S1508. As illustrated in FIGS. 10, 11, and 12, the output results $O_{1,1}$ to $O_{2,2}$ are calculated using Formulas 6 to 11 on the basis of the transfer pattern. In this manner, multiplication and cumulative sum are repeated. When the value of the variable m reaches 9, the output result ($O_{1,1}$, $O_{1,2}$, $O_{2,1}$, $O_{2,2}$) is stored in the memory 310 as the dilated convolution result.

In this manner, in the present embodiment, the shift amount and direction of the pixel and the coefficient are selected on the basis of the transfer pattern, the dilated convolution processing dilation rate, and the like, allowing for efficient transfer. Also, by data being received from eight adjacent units by a single pixel storage unit and coefficient storage unit, unnecessary calculations using a coefficient of zero are omitted and the pixels and coefficients required in the multiply-accumulate operation can all be output. Thus, dilated convolution processing can be efficiently performed.

Second Embodiment

In the present embodiment, the differences between the first embodiment will be described, and unless particularly mentioned, the other components are the same as in the first embodiment. In the present embodiment, processing is executed with a plurality of dilated convolution processing dilation rates R using hierarchical pixel storage units.

An example configuration of the storage unit 306 constituted by hierarchical pixel storage units will be described using the block diagram of FIG. 16. In the example of FIG. 16, there are three hierarchical levels, and there are three variables, $X_0$, $X_1$, $X_2$, of the hierarchical levels. A pixel is selected from the three hierarchical level pixel storage units, and a pixel can be output via the same throughput as in the configuration of FIG. 6 described in relation to the first embodiment. The plurality of pixel storage units include a plurality of multiplexers. Here, the hierarchical levels are not related to the CNN hierarchical layers.

In a first hierarchical level 1601, there are two types of shift amounts (1 or 0). In a pixel storage unit AA1604, a pixel selection unit AB1605 at the same position in a second hierarchical level 1602 and the pixel storage units adjacent above, below, to the left, and to the right of the pixel storage unit AA1604 are connected. In a case where the pixel selection unit AB1605 at the same position of the second hierarchical level 1602 is selected, the value of a variable $X_0$ of the hierarchical level corresponds to zero, and if not, then the value of the variable $X_0$ corresponds to 1.

In the second hierarchical level 1602, there are two types of shift amounts (2 or 0). In the pixel selection unit AB1605, a pixel selection unit AC1606 at the same position in a third hierarchical level 1603 and the pixel selection units not adjacent above, below, to the left, and to the right of the pixel selection unit AB1605 are connected. In a case where the pixel selection unit AC1606 at the same position of the third hierarchical level 1603 is selected, the value of a variable $X_1$ of the hierarchical level corresponds to zero, and if not, then the value of the variable $X_1$ corresponds to 1.

In the third hierarchical level 1603, there are two types of shift amounts (4 or 0). In the pixel selection unit AC1606, the pixel storage unit AA1604 at the same position in the first hierarchical level 1601 and the pixel selection units not adjacent above, below, to the left, and to the right of the pixel selection unit AC1606 are connected. In a case where the pixel storage unit AA1604 at the same position in the first hierarchical level 1601 is selected, the value of a variable $X_2$ of the hierarchical level corresponds to zero, and if not, then the value of the variable $X_2$ corresponds to 1.

When calculating $Ix($ $)$ and $Iy($ $)$ using Formula 10, the dilated convolution processing dilation rate R is calculated using the following Formula 12.

$$R = X_D \cdot 2^0 + X_1 \cdot 2_1 + X_2 \cdot 2^2 \qquad \text{(Formula 12)}$$

Accordingly, the maximum value of the dilated convolution processing dilation rate R corresponds to seven, and seven types, from one to seven, of the dilated convolution processing dilation rate R can be supported. The interval in the horizontal direction and the interval in the vertical direction of the read out data can be determined on the basis of the dilated convolution processing dilation rate R.

Figure 21:
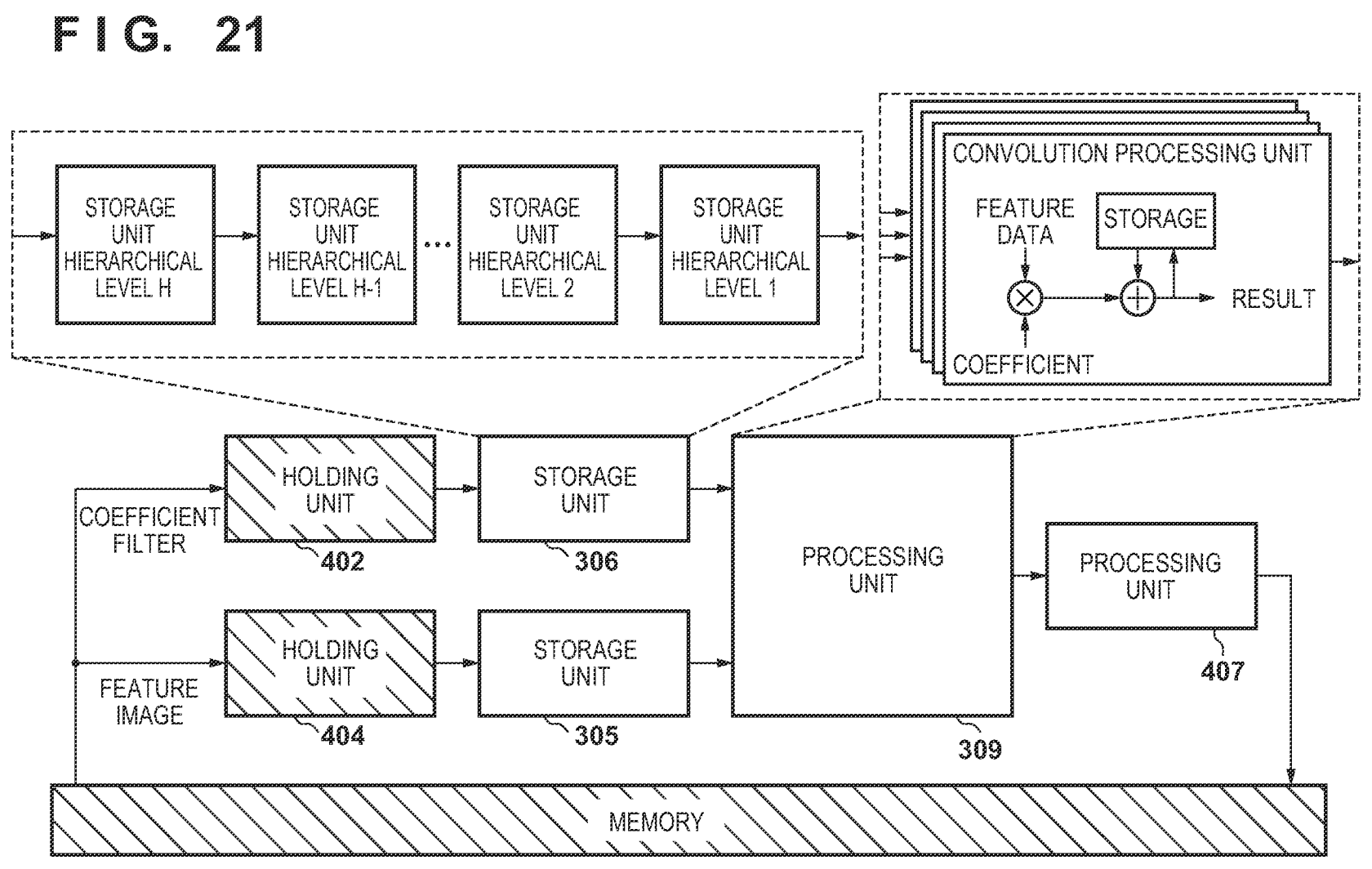

In a case where the number of hierarchical levels is H, the maximum value of the dilated convolution processing dilation rate R corresponds to $(2^H-1)$, and 1 to $(2^H-1)$ of $(2^H-1)$ types of the dilated convolution processing dilation rate R can be supported. FIG. 21 is a block diagram illustrating a configuration example of the CNN processing unit 1305 according to the present embodiment. In this example, the variable representing the hierarchical level is $X_i$ (i=1, . . . , H). In this case, the dilated convolution processing dilation rate R can be determined on the basis of the following Formula 13.

$$R = \sum_{i=0}^{H-1} X_i \cdot 2^i \qquad \text{(Formula 13)}$$

In this manner, according to the present embodiment, the hierarchical pixel storage units can support $(2^H-1)$ types of the dilated convolution processing dilation rate R at H times the circuit cost. This gives that advantage of high flexibility at a low hardware cost.

Third Embodiment

The first embodiment and the second embodiment are examples applied to a CNN. However, no such limitation is intended, and an example may be applied to an application (image processing application or the like) other than the CNN.

The first embodiment and the second embodiment are examples applied to a CNN that deals with two-dimensional data. However, no such limitation is intended, and an example may be applied to a CNN that deals with one-dimensional data or three- or more dimensional data.

In the first embodiment, there are 36 pixel storage units. However, depending on the application, the number of pixel storage units in the horizontal direction and the vertical direction may be determined and various input data sizes can be accommodated.

In the first embodiment, processing with the dilated convolution processing dilation rate R of 1 or 2 can be supported. However, input of the pixel storage units illustrated in FIG. 6 may be increased and processing with the dilated convolution processing dilation rate R of 3 or greater may be supported.

In the first embodiment and the second embodiment, pixels (data) are transferred in the horizontal direction and the vertical direction. However, data transfer is not limited to being two-dimensional, and simplified one-dimensional data transfer or three- or more dimensional data transfer may be implemented.

In the second embodiment, the results selected from the above, below, left, and right pixel storage units in the first hierarchical level 1601 and the second hierarchical level 1602 are transferred to the next hierarchical level. However, a hierarchical pixel storage unit may be provided for each of the four directions (above, below, to the left, and to the right).

In the first embodiment, the convolution processing is executed using the pre-dilation coefficient filter size of 3×3. However, the size of the pre-dilation coefficient filter is not limited to 3×3, and a discretionary size such as 2×2 may be used.

On the right side of FIG. 17, an example of coefficient filter dilation is illustrated in which the pre-dilation coefficient filter size is 2×2. As illustrated in frame 1704, a post-dilation coefficient filter (coefficient filter C'x, y on the right side) is obtained by dilation of the pre-dilation coefficient filter (coefficient filter Cx, y on the left side) according to the dilated convolution processing dilation rate R of 1. In a case where R is 1, the size does not change from the pre-dilation coefficient filter to the post-dilation coefficient filter.

As illustrated in frame 1705, a post-dilation coefficient filter (coefficient filter C'x, y on the right side) is obtained by dilation of the pre-dilation coefficient filter (coefficient filter Cx, y on the left side) according to the dilated convolution processing dilation rate R of 2. The post-dilation coefficient filter is a 3×3 coefficient filter obtained by inserting one inactive coefficients between the coefficients of the pre-dilation coefficient filter.

As illustrated in frame 1706, a post-dilation coefficient filter (coefficient filter C'x, y on the right side) is obtained by dilation of the pre-dilation coefficient filter (coefficient filter Cx, y on the left side) according to the dilated convolution processing dilation rate R of 4. The post-dilation coefficient filter is a 5×5 coefficient filter obtained by inserting three inactive coefficients between the coefficients of the pre-dilation coefficient filter.

Also, in a case where the pre-dilation coefficient filter size is 2×2, the index of the coordinates may be corrected, and $O_{i,j}(n)$ may be determined using the following Formula 14. In the Formula, the dilated convolution processing dilation rate R is a multiple of 2.

$$O_{i,j}(n) = \sum_{m=1}^{M} \sum_{x=0}^{1} \sum_{y=0}^{1} \left( I_{i-\frac{R}{2}+Rx, j-\frac{R}{2}+Ry}(m) \times C_{x,y}(m, n) \right)$$ (Formula 14)

In a case where the pre-dilation coefficient filter size is 2×2, the size can be made similar to the 3×3 coefficient filter using two cascade-connected coefficient filters. FIG. 18 is a diagram illustrating an example of cascade-connected dilated convolution processing coefficient filters.

In a case where the dilated convolution processing dilation rate R is 2, the size of the coefficient filters expands from 2×2 to 3×3. Because the position where the coefficient is zero is the same, the cascade-connected coefficient filters can be made similar to the coefficient filter with a size expanded from 3×3 to 5×5.

In a case where the dilated convolution processing dilation rate R is 4, the size of the coefficient filters expands from 2×2 to 5×5. Because the position where the coefficient is zero is the same, the cascade-connected coefficient filters can be made similar to the coefficient filter with a size expanded from 5×5 to 9×9.

FIG. 19 is a diagram illustrating an example of cascade-connected dilated convolution processing applied to a convolutional neural network. There are two convolution processing layers and three sets (C1, C1, and C2 or C1, C2, and C2) of the feature images. When used in combination with depthwise convolution processing, the number of coefficients in the coefficient filter of the cascade-connected dilated convolution processing is 8×C1, 4×C1×(C2+1), or 4×(C1+1) C2. In a case where the depthwise convolution processing is not used in combination, the number of coefficients in the coefficient filter of the cascade-connected dilated convolution processing is 4×(C1+C2)×C2 or 4×(C1+C2)×C1. The number of coefficients in the coefficient filters with size expanded from 3×3 to 5×5 is 9×C1×C2. Because the number C1 and C2 of the feature images can be adjusted and made less than a target with a similar number of coefficients of the cascade-connected dilated convolution processing, an effect of coefficient reduction is achieved.

FIG. 20 is a diagram illustrating an example of a convolutional neural network for image segmentation processing. The convolutional neural network include cascade-connected dilated convolution processing. Dilated convolution processing with a pre-dilation filter size of 2×2 is executed using the configuration of the first embodiment or the second embodiment, and the convolutional neural network illustrated in FIG. 20 is implemented.

Note that in the first embodiment and the second embodiment, the feature image is processed per pixel set. However, the processing described above may be executed treating a feature image as one pixel set.

The numerical values, processing timing, processing order, processing subject, configuration, transmission destination, transmission source, storage location of data (information), and the like used in the description of the embodiments are examples for facilitating a detailed description, and no such limitation to the examples is intended.

Also, a part or all of the embodiments described above may be combined as appropriate. Furthermore, a part or all of the embodiments described above may be selectively used.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2021-046240, filed Mar. 19, 2021, which is hereby incorporated by reference herein in its entirety.

What is claimed is:

1. An image processing apparatus, comprising:

one or more circuitry which function as:

a first obtaining unit configured to obtain pixel information, from a pixel storage unit at a specific position connected to a multiplier, the pixel storage units being a part of a plurality of pixel storage units arranged in a two-dimensional array, each pixel storage unit comprising a multiplexer and a memory which stores pixel information of each pixel of a feature image;

a second obtaining unit configured to obtain a coefficient from a coefficient filter;

a third obtaining unit configured to obtain a dilation rate for a dilated convolution operation;

a calculating unit configured to perform the dilated convolution operation using the multiplier and an adder, based on the pixel information obtained by the first obtaining unit, the coefficient obtained by the second obtaining unit, and the dilation rate obtained by the third obtaining unit, wherein one common coefficient is input to a plurality of the multipliers, wherein the pixel storage unit is connected to a pixel storage unit which stores an adjacent pixel in the feature image and a pixel storage unit which stores a non-adjacent pixel in the feature image, and the multiplexer can shift pixel information among pixel storage units by selecting a connection to a pixel storage unit;

in a case where the calculating unit performs the dilated convolution with the dilation rate of two or more, the multiplexer, by selecting a connection to a pixel storage unit that stores pixel information in the feature image that are non-adjacent to the pixel information already obtained by the first obtaining unit, shifts non-adjacent pixel information stored in the selected pixel storage unit to the pixel storage unit at the specific position, and in a case where the calculating unit performs the dilated convolution with the dilation rate of one, the multiplexer, by selecting a connection to a pixel storage unit that stores pixel information in the feature image that are adjacent to the pixel information already obtained by the first obtaining unit, shifts adjacent pixel information stored in the selected pixel storage unit to the pixel storage unit at the specific position.

2. The image processing apparatus according to claim 1, wherein the dilation rate is determined in accordance with any of a value set for each layer, a value set for a feature image of each layer, and a value set for a feature image group for each layer, and the multiplexer selects the pixel information to be obtained from the feature image by a shift amount based on the dilation rate.

3. The image processing apparatus according to claim 1, wherein the non-adjacent pixel information is non-adjacent pixel information in a horizontal direction or a vertical direction.

4. The image processing apparatus according to claim 1, wherein the image processing apparatus comprises a plurality of the pixel storage unit at the specific position, the pixel information that the first obtaining unit obtains from the pixel storage unit at the specific position is supplied to the calculation unit in parallel.

5. An image processing method, comprising:

obtaining pixel information from a pixel storage at a specific position connected to a multiplier the pixel storage being a part of a plurality of pixel storage units arranged in a two-dimensional array, each pixel storage unit comprising a multiplexer and a memory which stores pixel information of each pixel of a feature image;

obtaining a coefficient from a coefficient filter;

obtaining a dilation rate for a dilated convolution operation;

performing the dilated convolution operation using the multiplier and an adder, based on the pixel information obtained, the coefficient obtained and the dilation rate obtained, wherein one common coefficient is input to a plurality of the multipliers, wherein the pixel storage is connected to a pixel storage which store an adjacent pixel in the feature image and a pixel storage which store a non-adjacent pixel in the feature image, and the multiplexer can shift pixel information among pixel storage by selecting a connection to a pixel storage;

in a case where performing the dilated convolution with the dilation rate of two or more, the multiplexer, by selecting a connection to a pixel storage that stores pixel information in the feature image that are non-adjacent to the pixel information already obtained, shifts non-adjacent pixel information stored in the selected pixel storage to the pixel storage at the specific position, and in a case where performing the dilated convolution with the dilation rate of one, the multiplexer, by selecting a connection to a pixel storage that stores pixel information in the feature image that are adjacent to the pixel information already obtained, shifts adjacent pixel information stored in the selected pixel storage to the pixel storage at the specific position.

6. A non-transitory computer-readable storage medium storing a computer program for causing a computer to function as execute an image processing method, the method comprising:

obtaining pixel information, from a pixel storage at a specific position connected to a multiplier the pixel storage being a part of a plurality of pixel storage units arranged in a two-dimensional array, each pixel storage unit comprising a multiplexer and a memory which stores pixel information of each pixel of a feature image;

obtaining a coefficient from a coefficient filter;

obtaining a dilation rate for a dilated convolution operation;

performing the dilated convolution operation using the multiplier and an adder, based on the pixel information obtained, the coefficient obtained and the dilation rate obtained, wherein one common coefficient is input to a plurality of the multipliers, wherein the pixel storage is connected to a pixel storage which store an adjacent pixel in the feature image and a pixel storage which store a non-adjacent pixel in the feature image, and the multiplexer can shift pixel information among pixel storage by selecting a connection to a pixel storage;

in a case where performing the dilated convolution with the dilation rate of two or more, the multiplexer, by selecting a connection to a pixel storage that stores pixel information in the feature image that are non-adjacent to the pixel information already obtained, shifts non-adjacent pixel information stored in the selected pixel storage to the pixel storage at the specific position, and in a case where performing the dilated convolution with the dilation rate of one, the multiplexer, by selecting a connection to a pixel storage that stores pixel information in the feature image that are adjacent to the pixel information already obtained, shifts adjacent pixel information stored in the selected pixel storage to the pixel storage at the specific position.

7. An image processing apparatus performing convolution operation on a feature image using a filter comprising:

one or more circuitry which function as:

a pixel holding unit comprising a plurality of pixel storage units arranged in a two-dimensional array, each pixel storage unit comprising a multiplexer and a memory that stores pixel information of each pixel of a feature image, wherein the multiplexer connects the memory to a memory that stores adjacent pixel information and to a memory that stores non-adjacent pixel information;

a filter coefficient holding unit configured to hold filter coefficients;

a operation unit configured to obtain N pixel information from pixel storage units at specified positions among the plurality of pixel storage units, to multiply each of the N pixel information by a common coefficient retrieved from the filter coefficient holding unit using N multipliers, and to accumulate the N multiplication results;

a dilation rate acquiring unit configured to acquire a dilation rate; and a controller configured to control the multiplexer based on the acquired dilation rate, wherein shift amounts of pixel information stored in the pixel holding unit, as performed by the controlled multiplexer, depend on the acquired dilation rate, and wherein in a case where the filter is dilated, the controller controls the multiplexer to connect to the memory that stores non-adjacent pixel information corresponding to the dilation rate.

8. The image processing apparatus according to claim 7, wherein the non-adjacent pixel information is non-adjacent pixel information in a horizontal direction or a vertical direction.

9. The image processing apparatus according to claim 7, wherein the N pixel information are supplied from the pixel storage units at the specified positions to the N multipliers in parallel.

* * * * *